United States Patent
Teramoto et al.

(10) Patent No.: US 10,414,931 B2
(45) Date of Patent: Sep. 17, 2019

(54) INK COMPOSITION, INK SET, AND INK JET RECORDING DEVICE

(71) Applicant: Seiko Epson Corporation, Tokyo (JP)

(72) Inventors: Ryosuke Teramoto, Matsumoto (JP); Tomohiro Aruga, Matsumoto (JP); Tetsuya Aoyama, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/855,099

(22) Filed: Dec. 27, 2017

(65) Prior Publication Data

US 2018/0187031 A1   Jul. 5, 2018

(30) Foreign Application Priority Data

Dec. 29, 2016 (JP) ................. 2016-257341

(51) Int. Cl.
| | | |
|---|---|---|
| *C09D 11/322* | (2014.01) | |
| *C09D 11/38* | (2014.01) | |
| *C09D 11/40* | (2014.01) | |
| *B41J 2/175* | (2006.01) | |
| *C09D 11/10* | (2014.01) | |

(52) U.S. Cl.
CPC ............ *C09D 11/322* (2013.01); *B41J 2/175* (2013.01); *C09D 11/10* (2013.01); *C09D 11/38* (2013.01); *C09D 11/40* (2013.01)

(58) Field of Classification Search
CPC ........ B41J 2/175; C09D 11/322; C09D 11/10; C09D 11/38; C09D 11/40
See application file for complete search history.

(56) References Cited

U.S. PATENT DOCUMENTS

| | | |
|---|---|---|
| 9,278,527 B2 | 3/2016 | Aratani et al. |
| 2007/0037901 A1 | 2/2007 | Kanaya et al. |
| 2011/0217468 A1 | 9/2011 | Maruyama et al. |
| 2012/0242741 A1 | 9/2012 | Hasegawa et al. |
| 2013/0127953 A1* | 5/2013 | Furukawa ............ C09D 11/107 347/68 |

(Continued)

FOREIGN PATENT DOCUMENTS

| | | |
|---|---|---|
| EP | 1754759 A2 | 2/2007 |
| JP | 2011-178916 A | 9/2011 |

(Continued)

OTHER PUBLICATIONS

Extended European Search Report for EP Application No. 17208386.7, dated Mar. 6, 2018; 8 pages.

*Primary Examiner* — Thinh H Nguyen
(74) *Attorney, Agent, or Firm* — Harness, Dickey & Pierce, P.L.C.

(57) ABSTRACT

An ink composition of the invention is an ink composition to be charged in an ink storage container which includes an ink composition-replenishable ink chamber and an ink inlet, and the ink chamber is able to communicate with outside air. The ink composition includes a pigment; an organic compound; and water, and a resolubility index is 0.5 to 10 minutes, the resolubility index indicating a time required for that after the mass of the ink composition is decreased by 50%, the viscosity thereof is returned to an ink viscosity before the mass is decreased by addition of water in an amount equivalent to the decreased mass.

13 Claims, 5 Drawing Sheets

(56) References Cited

U.S. PATENT DOCUMENTS

| | | | |
|---|---|---|---|
| 2013/0149507 A1* | 6/2013 | Mostowy-Gallagher | C09D 11/033 428/195.1 |
| 2014/0125743 A1 | 5/2014 | Aruga | |
| 2015/0011687 A1 | 1/2015 | Shimanaka et al. | |
| 2015/0085034 A1 | 3/2015 | Aruga et al. | |
| 2016/0040022 A1 | 2/2016 | Aruga et al. | |
| 2016/0152849 A1 | 6/2016 | Nagai et al. | |

FOREIGN PATENT DOCUMENTS

| | | |
|---|---|---|
| JP | 04-803356 B2 | 10/2011 |
| JP | 2012-066417 A | 4/2012 |
| JP | 2013-166867 A | 8/2013 |
| JP | 2013-223980 A | 10/2013 |
| JP | 06-037111 B2 | 5/2014 |
| JP | 05-939432 B2 | 6/2016 |

* cited by examiner

INK COMPOSITION, INK SET, AND INK JET RECORDING DEVICE

BACKGROUND

1. Technical Field

The present invention relates to an ink composition, an ink set, and an ink jet recording device.

2. Related Art

Heretofore, there has been known an ink jet recording device which records an image and the like on a recording medium with fine ink droplets ejected from a nozzle of an ink jet recording print head. The ink jet recording device includes an ink storage container for supplying an ink composition to the recording print head. As the ink storage container, for example, there has been used a so-called continuous supply type ink storage container in which an ink composition is replenished (charged) without exchanging the ink storage container.

Since the continuous supply type ink storage container in which an ink can be replenished is an atmosphere open type container, a gas-liquid interface is present in the ink storage container. In particular, in the case of a pigment ink using a pigment as a colorant, the ink easily tends to be dried at the gas-liquid interface, and agglomerates (gas-liquid dried foreign materials) derived from the pigment, a resin, and the like are liable to be generated. Since provided in a printer, the ink storage container described above is not likely to be replaced with a new ink storage container, and since the ink storage container is configured to store a large volume of ink so that long-term continuous printing can be performed, the ink tends to be in contact with the air for a long time, and the gas-liquid dried foreign materials are liable to be accumulated in the ink storage container. Hence, the gas-liquid dried foreign materials may clog a supply flow path of the ink storage container and cause ink supply defects, some gas-liquid dried foreign materials which flow out of the ink storage container may clog a nozzle, and/or some gas-liquid dried foreign materials which adhere to a nozzle wall surface may cause a trouble on ejection stability, such as ejection curving, in some cases.

On the other hand, a printer including a continuous supply type ink storage container in which an ink can be replenished may be used in some cases to print letters and images on regular paper in an office or a SOHO. Hence, image robustness, such as water resistance and line-marker resistance, of a printed material is required.

Accordingly, for example, JP-A-2013-223980 has disclosed a technique in which in an ink supply system to supply an ink to a print head provided in a printer from an ink discharge portion of an ink tank through a tube interposed therebetween, when the type and the amount of a surfactant of an ink containing a colorant are defined, even if the ink supply system incorporates air bubbles when the ink is charged, a stable ink filling property and a continuous printing property can be obtained.

SUMMARY

However, for the ejection defect caused by gas-liquid interface foreign materials generated in long-term use by ink replenishment, the ink disclosed in JP-A-2013-223980 is not sufficient. In addition, since a dye is used in the ink disclosed in JP-A-2013-223980 as a colorant, the image robustness of an obtained printed material is also not sufficient.

Since several aspects of the invention overcome at least one of the above problems, an ink composition, an ink set, and an ink jet recording device, each of which suppresses the generation of gas-liquid interface foreign materials in long-term printing using a continuous supply type ink storage container and obtains a printed material excellent in not only continuous printing stability but also image robustness, can be provided.

The invention is made to overcome at least one of the problems described above and can be realized by the at least one of the following aspects or application examples.

Application Example 1

An ink composition according to one aspect of the invention is an ink composition to be charged in an ink storage container which includes an ink composition-replenishable ink chamber and an openable ink inlet, and the ink chamber is able to communicate with outside air. The ink composition includes: a pigment; an organic compound; and water, and a resolubility index of the ink composition is 0.5 to 10 minutes, the resolubility index indicating a time required for that after the mass of the ink composition is decreased by 50%, the viscosity thereof is returned to an ink viscosity before the mass is decreased by addition of water in an amount equivalent to the decreased mass.

According to the aspect of the application example 1, since the resolubility index of the ink composition is 0.5 to 10 minutes, there can be provided an ink composition which can suppress the generation of gas-liquid interface foreign materials in long-term printing using a continuous supply type ink storage container and which can obtain a printed material excellent in not only continuous printing stability but also image robustness.

Application Example 2

In the above application example, the resolubility index may be defined as a time required for that after 25 g of water is added to a thickened ink which is obtained by exposing 50 g of the ink composition in an environment of 25° C. and 40% RH until the mass thereof is decreased to 25 g, the water-added thickened ink is exposed in an environment of 25° C. and 40% RH so that a viscosity $\eta_1$ of the water-added thickened ink at 20° C. and a shear rate of 200 $s^{-1}$ reaches a viscosity $\eta_0$ of the ink composition before thickened at 20° C. and a shear rate of 200 $s^{-1}$.

According to the above application example, since the resolubility index is 0.5 to 10 minutes as described above, in long-term printing using a continuous supply type ink storage container, the generation of gas-liquid interface foreign materials can be suppressed, and a printed material excellent in not only continuous printing stability but also image robustness can be obtained.

Application Example 3

In the above application example, the pigment may be at least one selected from the group consisting of a self-dispersed pigment having a hydrophilic group on a pigment surface, a self-dispersed pigment having a hydrophilic group on a pigment surface with a phenyl group interposed therebetween, and a resin coated pigment covered with a dispersion resin or a water-insoluble polymer.

According to the above application example, since the pigment as described above is used, in long-term printing using a continuous supply type ink storage container, the generation of gas-liquid interface foreign materials can be suppressed, and a printed material excellent in not only continuous printing stability but also image robustness can be obtained.

Application Example 4

In the above application example, the ink composition may further include a resin emulsion.

According to the above application example, sine the resin emulsion is further included, the image robustness of an obtained printed material is improved.

Application Example 5

In the above application example, the total of organic compounds having a moisture absorption rate of 150% or more may be 15 to 30 percent by mass.

According to the above application example, in long-term printing using a continuous supply type ink storage container, the generation of gas-liquid interface foreign materials is suppressed, the continuous printing stability is improved, and also the image robustness of an obtained printed material is improved.

Application Example 6

In the above application example, the total of organic compounds having a moisture absorption rate of 300% or more may be 5 to 15 percent by mass.

According to the above application example, by the ink composition in which the total of organic compounds having a moisture absorption rate of 300% or more is 5 to 15 percent by mass, in long-term printing using a continuous supply type ink storage container, the generation of gas-liquid interface foreign materials is suppressed, the continuous printing stability is improved, and also the image robustness of an obtained printed material is improved.

Application Example 7

In the above application example, the organic compound having a moisture absorption rate of 150% or more may include trimethylglycine.

According to the above application example, since trimethylglycine is included, in long-term printing using a continuous supply type ink storage container, the generation of gas-liquid interface foreign materials is suppressed, the continuous printing stability is improved, and also the image robustness of an obtained printed material is improved.

Application Example 8

An ink set according to one aspect of the invention includes at least one of the ink compositions described in the application examples 1 to 7, and the ink composition includes at least one type of ink composition selected from the group consisting of a black ink composition and a color ink composition.

According to the aspect of the application example 8, in long-term printing using an ink set including at least one type of ink composition selected from the group consisting of a black ink composition and a color ink composition in a continuous supply type ink storage container, the generation of gas-liquid interface foreign materials can be suppressed, and a printed material excellent in not only continuous printing stability but also image robustness can be obtained.

Application Example 9

In the above application example, the ink set includes the black ink composition and the color ink composition, and the pigments contained in the black ink composition and the color ink composition each may be a self-dispersed pigment or a resin coated pigment.

According to the above application example, since the self-dispersed pigment or the resin coated pigment is used as the pigment, in long-term printing using a continuous supply type ink storage container, the generation of gas-liquid interface foreign materials can be suppressed, and a printed material excellent in not only continuous printing stability but also image robustness can be obtained.

Application Example 10

An ink jet recording device according to one aspect of the invention includes: an ink storage container receiving the ink set described in Application Example 8 or 9; a print head ejecting the ink composition; and an ink supply flow path supplying the ink composition from the ink storage container to the print head.

According to the aspect of Application Example 10, by the use of the ink composition described in the above application example, there can be provided an ink jet recording device which can suppress the generation of gas-liquid interface foreign materials in long-term printing using a continuous supply type ink storage container and which can obtain a printed material excellent in not only continuous printing stability but also image robustness.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
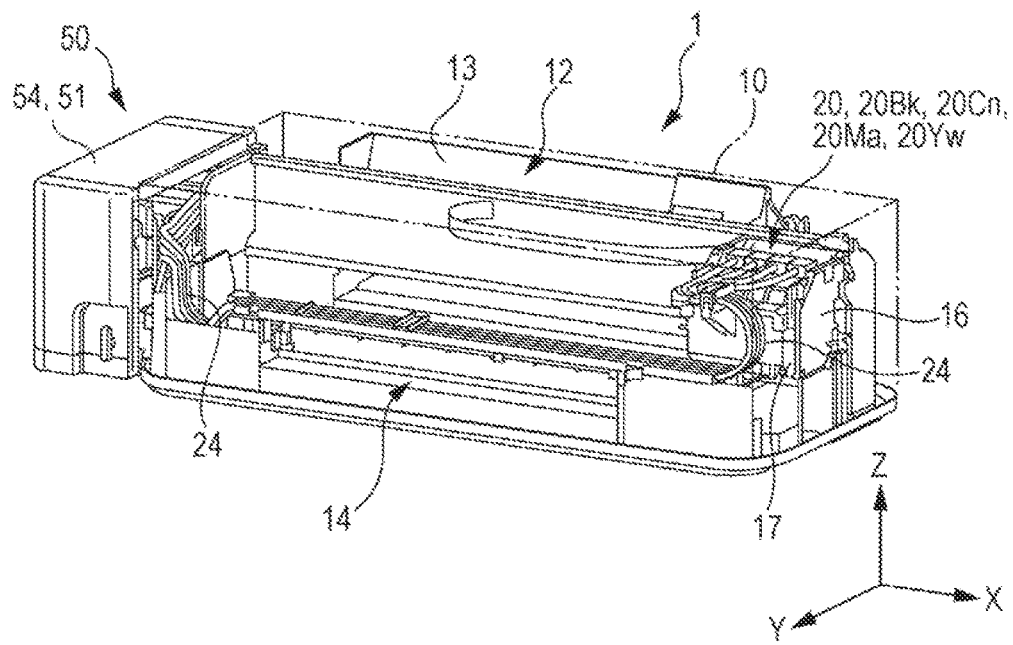
FIG. 1 is a schematic perspective view of an ink jet recording device according to one embodiment of the invention and shows the state in which an ink storage container is received in a container receiving case.

Hereinafter, preferable embodiments of the invention will be described. The following embodiments each will describe one example of the invention. In addition, the invention is not limited to the following embodiments and includes various modified examples to be performed without departing from the scope of the invention. In addition, all the structures described below are not always essential structures of the invention.

Hereinafter, as for an ink composition, an ink set, and an ink jet recording device according to the embodiments, the ink composition, the ink set, and the structure of the ink jet recording device capable of using the ink composition and the ink set will be described in this order.

1. INK COMPOSITION

An ink composition according to one embodiment of the invention is an ink composition to be charged in an ink storage container which includes an ink composition-replenishable ink chamber and an openable ink inlet, and the ink chamber is able to communicate with outside air. The ink composition includes: a pigment; an organic compound; and water, and a resolubility index of the ink composition is 0.5 to 10 minutes, the resolubility index indicating a time required for that after the mass of the ink composition is decreased by 50%, the viscosity thereof is returned to an ink viscosity before the mass is decreased by addition of water in an amount equivalent to the decreased mass.

Hereinafter, as for the ink composition (hereinafter, simply referred to as the "ink" in some cases) according to this embodiment, with reference to a black ink composition and a color ink composition by way of example, components contained in each of those ink compositions will be described in detail.

1.1. Black Ink Composition

First, as one example of the ink composition according to this embodiment, a black ink composition containing a black pigment as the pigment will be described.

1.1.1. Pigment

The ink composition according to this embodiment includes a pigment. Since the pigment is not likely to be faded by light, gas, and the like, when the pigment is used as a colorant, compared to the case of using a dye, a printed material excellent in image robustness, such as water resistance and line-marker resistance, can be obtained.

As a black ink composition pigment which can be used in this embodiment, known pigments, such as an inorganic pigment and an organic pigment, may be used, and for example, carbon black may be used.

The content of the pigment contained in the black ink composition is, with respect to the total mass of the ink composition, preferably 1 to 10 percent by mass, more preferably 2 to 8 percent by mass, and further preferably 3 to 7 percent by mass.

In order to apply the pigment to the ink composition, the pigment is required to be stably dispersed and held in water. As a method therefor, for example, there may be mentioned a method in which the pigment is dispersed using a resin dispersant, such as a water-soluble resin and/or a water-dispersible resin (hereinafter, the pigment dispersed by this method is referred to as the "resin-dispersed pigment"), a method in which the pigment is dispersed by a surfactant, such as a water-soluble surfactant and/or a water-dispersible surfactant (hereinafter, the pigment dispersed by this method is referred to as the "surfactant-dispersed pigment"), and a method in which without using a dispersant, such as the above resin or surfactant, the pigment is dispersed and/or dissolved in water by chemically and/or physically introducing a hydrophilic functional group to a pigment grain surface (hereinafter, the pigment dispersed by this method is referred to as the "self-dispersed pigment"). In this embodiment, the ink composition may use any of the above resin-dispersed pigment, surfactant-dispersed pigment, and self-dispersed pigment, and in needed, at least two types of pigments may be used in combination.

As the resin dispersant used for the resin-dispersed pigment, for example, there may be mentioned a poly(vinyl alcohol), a poly(vinyl pyrrolidone), a poly(acrylic acid), an acrylic acid-acrylonitrile copolymer, a vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleate copolymer, a vinyl acetate-crotonic acid copolymer, a vinyl acetate-acrylic acid copolymer, and the salts thereof. Among those compounds mentioned above, in particular, a copolymer formed from a monomer having a hydrophobic functional group and a monomer having a hydrophilic functional group and a polymer formed from a monomer having both a hydrophobic functional group and a hydrophilic functional group are preferable. As the form of the copolymer, any of a random copolymer, a block copolymer, an alternate copolymer, and a graft copolymer may be used.

As the above salts, for example, a salt with a basic compound, such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, or morpholine, may be mentioned. The addition amount of the basic compound mentioned above is not particularly limited as long as being not less than the neutralization equivalent of the above resin dispersant.

The molecular weight of the above resin dispersant is, as the weight average molecular weight, preferably 1,000 to 100,000 and more preferably 3,000 to 10,000. When the molecular weight is in the range described above, a stable dispersion of the colorant can be obtained in water, and for example, the viscosity can be easily controlled when the dispersant is applied to the ink composition.

As the resin dispersant described above, a commercially available product may also be used. In particular, for example, there may be mentioned Joncryl 67 (weight average molecular weight: 12,500, acid value: 213), Joncryl 678 (weight average molecular weight: 8,500, acid value: 215), Joncryl 586 (weight average molecular weight: 4,600, acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), and Joncryl 690 (weight average molecular weight: 16,500, acid value: 240) (trade names, manufactured by BASF Japan).

In addition, as the surfactant used for the surfactant-dispersed pigment, for example, there may be mentioned an anionic surfactant, such as an alkane sulfonate salt, an α-olefin sulfonate salt, an alkylbenzene sulfonate salt, an alkylnaphthalene sulfonate salt, an acylmethyl taurate salt, a dialkyl sulfosuccinate salt, an alkyl sulfate ester salt, a sulfated olefin, a polyoxyethylene alkyl ether sulfate ester salt, an alkyl phosphoric acid ester salt, a polyoxyethylene alkyl ether phosphate ester salt, or a monoglyceride phosphate ester salt; an amphoteric surfactant, such as an alkylpyridinium salt, an alkylamino acid salt, or an alkyl dimethyl betaine; or a nonionic surfactant, such as a polyoxyethylene alkyl ether, a polyoxyethylene alkylphenyl ether, a polyoxyethylene alkyl ester, a polyoxyethylene alkylamide, a glycerin alkyl ester, or a sorbitan alkyl ester.

The addition amount of the resin dispersant or the surfactant with respect to 100 parts by mass of the pigment is preferably 1 to 100 parts by mass and more preferably 5 to 50 parts by mass. When the addition amount is in the range described above, the dispersion stability of the pigment in water can be secured.

In this embodiment, in long-term printing using a continuous supply type ink storage container, as the pigment to be used for the black ink composition, among the above resin-dispersed pigment, surfactant-dispersed pigment, and self-dispersed pigment, the self-dispersed pigment is preferably used.

As described above, the self-dispersed pigment is a pigment that can be dispersed and/or dissolved in an aqueous medium without using the dispersant. In this case, the "dispersed and/or dissolved in an aqueous medium without using the dispersant" indicates the state in which without using the dispersant which disperses the pigment, the pigment is stably present in an aqueous medium by a hydrophilic group present on the surface of the pigment.

An ink containing the self-dispersed pigment as a colorant is not required to contain a dispersant which disperses a general pigment, and the generation of bubbles caused by a decrease in defoaming performance caused by the dispersant hardly occurs, so that an ink excellent in ejection stability can be easily prepared. In addition, the ejection reliability is excellent since gas-liquid dried foreign materials caused by the dispersant can be suppressed, and since a significant increase in viscosity caused by the dispersant can also be suppressed, a larger amount of the pigment can be contained, so that the print density can be sufficiently increased.

The self-dispersed pigment used for the black ink composition in this embodiment is a self-dispersed pigment having a hydrophilic group on the surface thereof, and the hydrophilic group is at least one selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$ (in the formula, M represents a hydrogen atom, an alkali metal, ammonium, or an organic ammonium, and R represents an alkyl group having 1 to 12 carbon atoms or a naphthyl group which may have a substituent).

In addition, as a pigment to be used as a raw material of the self-dispersed pigment used for the black ink composition, for example, carbon black manufactured by a known method, such as a contact method, a furnace method, or a thermal method, may be used. As a particular example of preferable carbon black in this embodiment, for example, there may be mentioned No. 2300, 900, MCF88, No. 20B, No. 33, No. 40, No. 45, No. 52, MA7, MA8, MA100, or No2200B (each manufactured by Mitsubishi Chemical Corp.); Color Black FW1, FW2, FW2V, FW18, FW200, S150, S160, S170, Pritex 35, U, V, 140U, Special Black 6, 5, 4A, 4, or 250 (each manufactured by Degussa); Conductex SC, Raven 1255, 5750, 5250, 5000, 3500, 1255, or 700 (each manufactured by Columbia Carbon); Regal 400R, 330R, 660R, Mogul L, Monarch 700, 800, 880, 900, 1000, 1100, 1300, 1400, or Elftex 12 (each manufactured by Cabot). Those carbon blacks may be used alone, or at least two types thereof may be used as a mixture.

The self-dispersed pigment used for the black ink composition may be manufactured, for example, by performing a physical treatment or a chemical treatment on the pigment so as to bond a hydrophilic group to the pigment surface. As the physical treatment described above, for example, a vacuum plasma treatment may be mentioned. In addition, as the chemical treatment, for example, there may be mentioned a wet oxidation method in which oxidation is performed in water using an oxidant.

In addition, in this embodiment, as the self-dispersed pigment, a black self-dispersed pigment which is surface-treated by an oxidation treatment using a hypohalous acid and/or a hypohalous acid salt, an oxidation treatment using ozone, or an oxidation treatment using persulfuric acid and/or a persulfate salt is preferable since the color development property is high. In addition, as the self-dispersed pigment of the black ink composition, a commercially available product may also be used, and as a preferable example, for example, Microjet CW1 (manufactured by Orient Chemical Industries, Co., Ltd.) may be mentioned.

In this embodiment, the content of the self-dispersed pigment contained in the black ink composition with respect to the total mass of the ink composition is preferably 1 to 10 percent by mass, more preferably 2 to 8 percent by mass, and further preferably 3 to 7 percent by mass.

1.1.2. Organic Compound

The ink composition according to this embodiment includes an organic compound. Since the ink composition includes the organic compound, the drying property of the ink composition ejected on a recording medium is improved, and a printed material excellent in image robustness can be obtained. In addition, since the organic compound is contained, the pigment, the dispersion resin, and the resin particles are suppressed from being formed into foreign materials by precipitation thereof caused by drying of the ink, and furthermore, the resolubility index of the ink which will be described later can be set in an appropriate range. Hence, in long-term printing using a continuous supply type ink storage container, the generation of gas-liquid interface foreign materials is suppressed, the continuous printing stability is improved, and the image robustness of an obtained printed material is also improved.

As the organic compound used for the ink composition, a water-soluble organic compound is preferable. When the water-soluble organic compound is used, in long-term printing using a continuous supply type ink storage container, the generation of gas-liquid interface foreign materials is suppressed, the continuous printing stability is improved, and the drying property of the ink composition is also further improved, so that a printed material excellent in image robustness can be obtained.

In addition, the "water-soluble" in this specification represents a property dissolved in water and, in particular, represents that the solubility (mass of a solute with respect to 100 g of water) to water at 20° C. is 10.0 g or more.

Although the water-soluble organic compound is not particularly limited, for example, a polyol compound, a pyrrolidone derivative, a glycol ether, and a betaine may be mentioned.

As the polyol compound, for example, there may be mentioned a polyol compound (preferably a diol compound) which has 2 to 6 carbon atoms in its molecule and which may also have one ether bond therein. As a particular example, there may be mentioned a glycol, such as ethylene glycol, diethylene glycol, triethylene glycol, a polyethylene glycol, propylene glycol, dipropylene glycol, tripropylene glycol, a polypropylene glycol, a polyoxyethylene polyoxypropylene glycol, trimethylolpropane, methyl triglycol (triethylene glycol monomethyl ether), butyl triglycol (triethylene glycol monobutyl ether), butyl diglycol (diethylene glycol monobutyl ether), dipropylene glycol monopropyl ether, glycerin, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-pentanediol, 1,5-pentanediol, 1,6-hexanediol, 2-methyl-2,4-pentanediol, or 3-methyl-1,5-pentanediol.

Among the polyol compounds, glycerin having a normal boiling point of 280° C. or more or trimethylolpropane which is a solid organic compound at a normal temperature is preferably used.

In addition, as the organic compound, for example, there may be used a so-called solid wetting agent including a sugar, such as glucose, mannose, fructose, ribose, xylose, arabinose, galactose, aldonic acid, glucitol (sorbitol), maltose, cellobiose, lactose, sucrose, trehalose, and maltotriose, each of which is a solid polyalcohol at a normal temperature; a sugar alcohol, a hyaluronic acid, and a urea.

In this specification, the "normal temperature" represents room temperature and a temperature of approximately 23° C. The normal temperature is preferably 18° C. to 28° C., more preferably 20° C. to 26° C., and further preferably 21° C. to 25° C.

As the pyrrolidone derivative, for example, there may be mentioned N-methyl-2-pyrrolidone, N-ethyl-2-pyrrolidone, N-vinyl-2-pyrrolidone, 2-pyrrolidone, N-butyl-2-pyrrolidone, or 5-methyl-2-pyrrolidone. Those compounds may be used alone, or at least two types thereof may be used by mixing. Since the pyrrolidone derivative functions as a preferable dissolving agent of resins, a recorded material excellent in abrasion resistance can be obtained, and clogging of a print head and a nozzle can be prevented.

As the glycol ether, for example, there may be mentioned hexyl glycol, 2-ethylhexyl glycol, ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, diethylene glycol monophenyl ether, or tetraethylene glycol monobutyl ether. Those compounds may be used alone, or at least two types thereof may be used by mixing. The glycol ether may control, for example, the wettability of the ink composition to a recording medium.

The betaine may include a compound (dipole ion) having stable positive and negative charges in its molecule and is a compound (intermolecular salt) in which a positive charge and a negative charge are located at positions not adjacent to each other in the same molecule, a dissociable hydrogen atom is not bonded to an atom having a positive charge, and the entire molecule has no charge. As a preferable betaine, an N-alkyl substitute of an amino acid may be mentioned, and an N-trialkyl substituent of an amino acid is more preferable. For example, as the betaine, trimethylglycine (also called "glycine betaine"), α-butyrobetaine, homarine, trigonelline, carnitine, homoserine betaine, valine betaine, lysine betaine, ornithine betaine, alanine betaine, stachydrine, or glutamic acid betaine may be mentioned, and for example, trimethylglycine is preferable.

In addition, as described below, according to the black ink composition of this embodiment, the total of organic compounds having a moisture absorption rate of 150% or more is, with respect to the total mass (100 percent by mass) of the ink composition, preferably 15 to 30 percent by mass, more preferably 16 to 28 percent by mass, and further preferably 17 to 26 percent by mass. Since the organic compounds having a moisture absorption rate of 150% or more are contained in a range of 15 to 30 percent by mass, the increase in viscosity of the ink at a normal temperature (such as a temperature of approximately 23° C.) can be suppressed, and hence, a nozzle of a print head can be prevented from being dried and clogged, so that an ink excellent in ejection stability can be obtained. In addition, the pigment and the dispersion resin contained in a pigment dispersion or the resin particles contained in a resin emulsion are suppressed from being formed into foreign materials by precipitation thereof caused by drying of the ink, and furthermore, the resolubility index which will be described later may be set in an appropriate range. Hence, in long-term printing using a continuous supply type ink storage container, the generation of gas-liquid interface foreign materials is suppressed, the continuous printing stability is improved, and the image robustness of an obtained printed material is also improved.

Among the organic compounds having a moisture absorption rate of 150% or more, although the upper limit of the moisture absorption rate is not particularly limited, the moisture absorption rate is preferably 400% or less, more preferably 380% or less, and further preferably 360% or less.

In addition, among the organic compounds having a moisture absorption rate of 150% or more, the total of organic compounds having a moisture absorption rate of 300% or more is preferably 5 to 15 percent by mass, more preferably 6 to 10 percent by mass, and further preferably 7 to 8 percent by mass. Since the total of organic compounds having a moisture absorption rate of 300% is contained in an amount of 5 to 15 percent by mass, in long-term printing using a continuous supply type ink storage container, the generation of gas-liquid interface foreign materials is further suppressed, the continuous printing stability is improved, and the image robustness of an obtained image is also further improved.

In addition, although the organic compounds having a moisture absorption rate of 150% or more may be used alone, or at least two types thereof may be used by mixing, a plurality of organic compounds is preferably contained so that the total thereof is in a range of 15 to 30 percent by mass. In particular, when a plurality of organic compounds is contained, organic compounds having different moisture absorption rates are preferably contained. For example, an organic compound having a moisture absorption rate of approximately 150%, an organic compound having a moisture absorption rate of approximately 180%, an organic compound having a moisture absorption rate of approximately 230%, and organic compounds having a moisture absorption rate of approximately 300% are preferably contained so that the contents thereof are approximately equal to each other and so that the total thereof is 15 to 30 percent by mass. As described above, when the organic compounds having different moisture absorption rates are contained with a good balance, in long-term printing using a continuous supply type ink storage container, the generation of gas-liquid interface foreign materials is suppressed, the continuous printing stability is improved, and the image robustness of an obtained printed material is also improved.

In this embodiment, the moisture absorption rate (unit: %) represents the ratio (B/A) of a moisture mass (B) to be held in an organic compound with respect to the mass (A) thereof, and for example, a moisture absorption rate in an environment of 25° C. and 99% RH can be obtained by the following measurement method.

First, after the mass of the organic compound exposed to an environment of 25° C. and 50% RH is measured and is represented by a mass (A), the organic compound is exposed to an environment of 25° C. and 99% RH, and the mass thereof is measured with time. Subsequently, when the mass of the organic compound thus measured is not changed with time, the mass at this point is represented by (C), (C)-(A) is calculated, and the value thus calculated is represented by a moisture mass (B) which can be held in the organic compound. Subsequently, the moisture absorption rate in an environment of 25° C. and 99% RH is obtained from the following formula (1).

Moisture absorption rate (%)=(B)/(A)×100    Formula (1)

Examples of the moisture absorption rate of the organic compound in an environment of 25° C. and 99% RH are shown in Table 1.

TABLE 1

| Moisture Absorption Rate of Organic Compound (25° C. 99% RH) | |
| --- | --- |
| Trimethylglycine | 360% |
| Glycerin | 240% |
| Urea | 200% |
| Triethylene Glycol | 190% |
| Triethanolamine | 190% |
| Trimethylolpropane | 180% |
| 1,5-Pentanediol | 180% |
| 2-Pyrrolidone | 100% |
| 1,2-Hexanediol | 60% |
| Triethylene Glycol Monomethyl Ether | 20% |

As shown in Table 1, as the organic compound having a moisture absorption rate of 150% or more in an environment of 25° C. and 99% RH, for example, there may be mentioned glycerin (240%), triethylene glycol (190%), triethanolamine (190%), urea (200%), trimethylglycine (360%), trimethylolpropane (180%), and 1,5-pentanediol (180%). In this embodiment, at least two types of those compounds are preferably contained by mixing so that the total thereof is to 30 percent by mass. In this case, in long-term printing using a continuous supply type ink storage container, the generation of gas-liquid interface foreign materials is suppressed, the continuous printing stability is improved, and the image robustness of an obtained printed material is also improved.

1.1.3. Water

In this embodiment, the ink composition includes water. Water is a main medium of the ink composition and is a component to be evaporated and scattered by drying. Water is preferably pure water, such as ion-exchanged water, ultrafiltrated water, reverse osmosis water, or distilled water, or ultrapure water in which ionic impurities are removed as much as possible. In addition, when water sterilized, for example, by UV irradiation or by addition of hydrogen peroxide is used, in the case of long-term storage of the ink composition, the generation of fungi and bacteria can be preferably suppressed.

The content of water with respect to the total mass of the ink composition is preferably 50 percent by mass or more, more preferably 60 percent by mass or more, and particularly preferably 65 percent by mass or more.

When the content of water contained in the ink composition is set in the range described above, since the moisture content to be absorbed in cellulose in coated paper is decreased as compared to that of a related ink composition, swelling of cellulose which is believed to cause cockling and curling can be suppressed. Hence, the ink composition of this embodiment is also useful for a recording medium, such as regular paper or printing coated paper (printing paper), having an absorption layer on a paper-support body which has a poor ink absorption property.

1.1.4. Resin Emulsion

In this embodiment, the ink composition may include a resin emulsion. In the resin emulsion, as the ink is dried, since resin particles are fused with each other or resin particles and a color component are fused with each other, and the pigment is fixed to a recording medium, the resin emulsion has a function to improve a fixing property of an image portion of a recorded material, and the image robustness of an obtained printed material is improved. In addition, when a resin functioning as a binder is contained in an emulsion state in the ink composition, the viscosity of the ink composition is likely to be controlled in an appropriate range for an ink jet recording method, and in addition, the storage stability and the ejection stability of the ink composition can be improved.

Incidentally, the resin emulsion represents the state in which a resin component hardly soluble or insoluble in a liquid medium of the ink composition is formed into fine particles so as to be dispersed in the liquid medium of the ink composition, and the resin particles forming the resin emulsion are contained in an emulsion state in the ink composition.

Resin particles usable for the resin emulsion described above are preferably formed from at least one type selected from the group consisting of an acrylic resin, a methacrylic resin, a styrene resin, a urethane resin, an acrylamide resin, and an epoxy resin. Those resins may be used in the form of either a homopolymer or a copolymer.

In this embodiment, as the resin particles, a single particle structure may be used. On the other hand, in this embodiment, a resin particle having a core shell structure formed of a shell portion and a core portion surrounded thereby may also be used. In addition, in this specification, the "core shell structure" represents a "structure in which at least two types of polymers having different compositions are present in a phase separation state in the particle". Hence, besides the structure in which the shell portion fully covers the core portion, a structure in which the shell portion partially covers the core portion may also be used. In addition, a structure in which a shell portion polymer partially forms a domain or the like in a core particle may also be used. Furthermore, a multilayer structure having at least three layers in which at least one layer is further provided between the core portion and the shell portion may also be used.

The resin particles used in this embodiment may be obtained by a known emulsion polymerization. That is, the resin particles may be obtained by emulsion polymerization performed in water using an unsaturated vinyl monomer together with a polymerization catalyst and an emulsifier.

As the unsaturated vinyl monomer, for example, there may be mentioned an acrylate ester monomer, a methacrylate ester monomer, an aromatic vinyl monomer, a vinyl ester monomer, a vinyl cyanide compound monomer, a halogenated monomer, an olefin monomer, or a diene monomer, each of which can be generally used for emulsion polymerization.

As a particular example of the unsaturated vinyl monomer, for example, there may be mentioned an acrylate ester, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, or glycidyl acrylate; a methacrylate ester, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, or glycidyl methacrylate; a vinyl ester, such as vinyl acetate; a vinyl cyanide compound, such as acrylonitrile or methacrylonitrile; a halogenated monomer, such as vinylidene chloride or vinyl chloride; an aromatic vinyl monomer, such as styrene, α-methylstyrene, vinyltoluene, t-butylstyrene, chlorostyrene, vinylanisole, or vinylnaphthalene; an olefin, such as ethylene or propylene; a diene, such as butadiene or chloroprene; a vinyl monomer, such as vinyl ether, vinyl ketone, or vinyl pyrrolidone; an unsaturated carboxylic acid, such as acrylic acid, methacrylic acid, itaconic acid, fumaric acid, or maleic acid; an acrylamide, such as acrylamide or N,N'-dimethylacrylamide; or a hydroxide-containing monomer, such as 2-hydroxyethyl acrylate, 2-hydroxypropyle acrylate, 2-hydroxyethyl methacrylate, or 2-hydroxypropyl methacrylate.

In addition, in this embodiment, as a molecule derived from the above monomer, a molecule having a cross-linked structure formed from a cross-linkable monomer having at least two polymerizable double bonds may be used. As an example of the cross-linkable monomer having at least two polymerizable double bonds, for example, there may be mentioned a diacrylate compound, such as a polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, a polypropylene glycol diacrylate, 2,2'-bis(4-acryloxy propyloxy phenyl)propane, or 2,2'-bis(4-acryloxy diethoxy phenyl)propane; a triacrylate compound, such as trimethylolpropane triacrylate, trimethylolethane triacrylate, or tetramethylolmethane triacrylate; a tetraacrylate compound, such as ditrimethylol tetraacrylate, tetramethylolmethane tetraacrylate, or pentaerythritol tetraacrylate; a hexaacrylate compound, such as dipentaerythritol hexaacrylate; a dimethacrylate compound, such as ethylene glycol dimethacrylate, diethylene glycol dimethacrylate, triethylene glycol dimethacrylate, a polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, a polypropylene glycol dimethacrylate, a polybutylene glycol dimethacrylate, or 2,2'-bis(4-acryloxy diethoxy phenyl)propane; a trimethacrylate compound, such as trimethylolpropane trimethacrylate or trimethylolethane trimethacrylate; methylene bisacrylamide, or divinylbenzene, and those compounds may be used alone, or at least two types thereof may be used by mixing.

In addition, a polymerization initiator, an emulsifier, and a molecular weight modifier, each of which are to be used in emulsion polymerization, may be used in accordance with a normal method.

As the polymerization initiator, a compound similar to that used in normal radical polymerization may be used, and for example, there may be mentioned potassium persulfate, ammonium persulfate, hydrogen peroxide, azobisisobutyronitrile, benzoyl peroxide, dibutyl peroxide, peracetic acid, cumene hydroperoxide, t-butyl hydroperoxide, or paramethane hydroperoxide. In particular, as described above, when a polymerization reaction is performed in water, a water-soluble polymerization initiator is preferably used.

As the emulsifier, for example, besides sodium lauryl sulfate, in general, a compound which has been used as an anionic surfactant, a nonionic surfactant, or a amphoteric surfactant, or a mixture formed therefrom may be mentioned, and those compounds may be used alone, or at least two types thereof may be used by mixing.

When the resin particles are manufactured by emulsion polymerization, and in particular, when a polymer emulsion formed of anionic resin particle is manufactured by emulsion polymerization, since negative polar groups, such as a carboxyl group and/or a sulfonic group, are present on surfaces of the resin particles, pH is shifted to an acidic side, and an increase in viscosity and agglomeration are liable to occur. Hence, in general, neutralization is performed using a basic substance. As this basic substance, for example, ammonia, an organic amine, or an inorganic hydroxide may be used. In addition, in view of long-term storage stability and ejection stability of the polymer emulsion and the aqueous ink composition, among the compounds mentioned above, a monovalent inorganic hydroxide (potassium hydroxide, sodium hydroxide, or lithium hydroxide) is preferable. The addition amount of the above neutralizer is appropriately determined so that the polymer emulsion has a pH of 7.5 to 9.5 and preferably has a pH of 7.5 to 8.5.

In view of the long-term storage stability and the ejection stability of the ink composition, in this embodiment, the volume average particle diameter of the resin particles is preferably in a range of 5 to 400 nm and more preferably in a range of 50 to 200 nm.

In addition, although the addition amount of the resin emulsion may be appropriately determined in view of the fixing property and the like, the solid component thereof contained in each ink composition is preferably set to 2 percent by mass or more.

1.1.5. Surfactant

In this embodiment, the ink composition preferably contains a surfactant. As the surfactant, an anionic surfactant, a cationic surfactant, an amphoteric surfactant, and/or a nonionic surfactant may be contained. In order to obtain an ink composition in which foaming is not likely to occur, a nonionic surfactant is particularly preferable.

As a particular example of the nonionic surfactant, for example, there may be mentioned an acetylene glycol surfactant; an acetylene alcohol surfactant; an ether compound, such as a polyoxyethylene nonylphenyl ether, a polyoxyethylene octylphenyl ether, a polyoxyethylene decylphenyl ether, a polyoxyethylene alkylallyl ether, a polyoxyethylene oleyl ether, a polyoxyethylene lauryl ether, a polyoxyethylene alkyl ether, or a polyoxyalkylene alkyl ether; an ester compound, such as a polyoxyethylene oleate, a polyoxyethylene distearate, sorbitan laurate, sorbitan monostearate, sorbitan monooleate, sorbitan sesquioleate, a polyoxyethylene monooleate, or a polyoxyehtylene stearate; a polyether modified siloxane surfactant, such as dimethylpolysiloxane; or a fluorine-containing surfactant, such as a fluorinated alkyl ester or a perfluoroalkyl carboxylic acid salt. Those nonionic surfactants may be used alone, or at least two types thereof may be used in combination.

Among the above nonionic surfactants, in particular, since being unlikely to generate bubbles and having an excellent defoaming property, the acetylene glycol surfactant and/or the polyether modified siloxane surfactant is preferable.

As a particular example of the acetylene glycol surfactant, although 2,4,7,9-tetramethyl-5-decyne-4,7-diol, 3,6-dimethyl-4-octyne-3,6-diol, 3,5-dimethyl-1-hexyne-3-ol, or the like may be mentioned, a commercially available product may also be used, and for example, there may be mentioned Surfynol 104, 82, 465, 485, or TG manufactured by Air Products, or Olefin STG or Olefin E1010 manufactured by Nisshin Chemical Industry Co., Ltd. As a particular example of the polyether modified siloxane surfactant, for example, there may be mentioned BYK-345, BYK-346, BYK-347, BYK-348, or UV3530 manufactured by BYK Japan KK. Among those compounds mentioned above, at least two types thereof may be used in the ink composition, the surface tension is preferably controlled to 20 to 40 mN/m, and the content thereof in the ink composition is 0.1 to 3.0 percent by mass.

1.1.6. pH Adjuster

In this embodiment, the black ink composition may further contain a pH adjuster. As the pH adjuster, for example, there may be used an alkali hydroxide, such as lithium hydroxide, potassium hydroxide, or sodium hydroxide; ammonia; and/or an alkanolamine, such triethanolamine, tripropanolamine, diethanolamine, or monoethanolamine. In particular, at least one type of pH adjuster selected from a hydroxide of an alkali metal, ammonia, triethanolamine, and tripropanolamine is preferably contained so that the pH is adjusted to 6 to 10. When the pH is out of the range described above, for example, materials forming the ink jet recording device may be adversely influenced, and a clogging recovery property may be degraded in some cases.

In addition, if needed, for example, collidine, imidazole, phosphoric acid, 3-(N-morpholine)propane sulfonic acid, tris(hydroxymethyl)aminomethane, and/or boric acid may be used as the pH adjuster.

1.1.7. Other Contained Components

In this embodiment, the black ink composition may further contain an antioxidant/UV absorber, an antiseptic agent/fungicide, antirust agent, a chelating agent, and/or a defoaming agent. When at least one of those materials is added, the performance of the ink composition can be further improved.

As the antioxidant/UV absorber, for example, there may be used an allophanate, such as allophanate or methyl allophanate; a biuret, such as biuret, dimethylbiuret, or tetramethylbiuret; L-ascorbic acid and its salt; or a lanthanide oxide, such as Tinuvin 328, 900, 1130, 384, 292, 123, 144, 622, 770, or 292, Irgacor 252 or 153, Irganox 1010, 1076, or 1035, or MD1024 (each manufactured by Ciba-Geigy).

As the antiseptic agent/fungicide, for example, there may be mentioned sodium benzoate, sodium pentachlorophenol, sodium 2-pyridinethiol-1-oxide, sodium sorbate, sodium dehydroacetate, or 1,2-benzisothiazolin-3-one. As a commercially available product, for example, Proxel XL2 or Proxel GXL (trade names, manufactured by Avecia) or Denicide CSA or NS-500W (trade names, manufactured by Nagase Chemtech Corp.) may be mentioned.

As the antirust agent, for example, benzotriazole may be mentioned.

As the chelating agent, for example, ethylenediaminetetraacetic acid and its salt (such as disodium dihydrogen ethylenediaminetetraacetic acetate) may be mentioned.

1.1.8. Method for Preparing Ink Composition

In this embodiment, when the components described above are mixed together in an arbitrary order, and if needed, when impurities are removed by filtration or the like, the black ink composition can be obtained. As a mixing method of the components, a method in which stirring and mixing are performed by sequentially charging the components in a container equipped with a stirring device, such as a mechanical stirrer or a magnetic stirrer, is preferably performed. As a filtration method, if needed, centrifugal filtration, filter filtration, or the like may be performed.

1.1.9. Physical Properties of Ink Composition

In this embodiment, the black ink composition is used after being charged in an ink storage container which has an ink composition-replenishable ink chamber capable of communicating with outside air and an openable ink inlet. In the black ink composition of this embodiment as described above, the resolubility index is 0.5 to 10 minutes, preferably 0.5 to 7.0 minutes, and more preferably 4.0 to 7.0 minutes, the resolubility index indicating a time required for that after the mass of the ink composition is decreased by 50%, the viscosity thereof is returned to an ink viscosity before the mass is decreased by addition of water in an amount equivalent to the decreased mass.

Since the black ink composition of this embodiment has a resolubility index of 0.5 to 10 minutes, when the resolubility index is 0.5 minutes or more, the water resistance of a printed material can be improved, and when the resolubility index is 10 minutes or less, in a ink jet recording device in which the ink is replenished and used as described below, the generation of gas-liquid interface foreign materials at the gas-liquid interface can be suppressed in long-term use, so that even in printer long-term use, the printing stability can be improved. In addition, since the pigment is used as a colorant, a printed material having a high image robustness which is particularly obtained by a pigment ink can be provided.

In this case, the resolubility index described above indicates a time required for that after 25 g of water is added to a thickened ink obtained by exposing 50 g of the ink composition in an environment of 25° C. and 40% RH until the mass thereof is decreased to 25 g, the water-added thickened ink is exposed in an environment of 25° C. and 40% RH until a viscosity $\eta_1$ of the water-added thickened ink at 20° C. and a shear rate of 200 $s^{-1}$ reaches a viscosity $\eta_0$ of the ink composition before thickened at 20° C. and a shear rate of 200 $s^{-1}$.

As a method for calculating the resolubility index, for example, the method described in the following example may be mentioned. In particular, for the resolubility index calculation, an ink before being exposed is prepared, and the viscosity $\eta_0$ thereof at 20° C. and a shear rate of 200 s$^{-1}$ is measured by a viscoelastic measurement device Physica MCR301 (trade name, manufactured by Anton Paar Japan K.K.). Next, 50 g of the ink is charged in a beaker and is exposed in an environment of 25° C. and 40% RH without closing an opening of the beaker until the ink weight is decreased to approximately 25 g, so that a thickened ink is obtained. The thickened ink thus obtained is slowly sampled using a spatula and is placed in a petri dish, and a mass W1 of this thickened ink is measured. In addition, water in an amount equivalent to that of the ink thus sampled is dripped to this thickened ink using a dropper, and this petri dish is exposed in an environment of 25° C. and 40% RH. Subsequently, the viscosity $\eta_1$ at 20° C. and a shear rate of 200 s$^{-1}$ is measured, and a time at which $\eta_1 = \eta_0$ is obtained is measured and is regarded as the resolubility index (minutes). Alternatively, the viscosity is measured with arbitrary time intervals, and from an approximate curve between the time and the viscosity, a time at which viscosity $\eta_0$ is obtained may be regarded as the resolubility index.

In addition, in this embodiment, in consideration of the balance between the image quality and the reliability of the ink for the ink jet recording, the surface tension of the black ink composition at 20° C. is preferably 20 to 40 mN/m and more preferably 20 to 35 mN/m. In addition, the measurement of the surface tension can be performed by confirming a surface tension obtained when a platinum plate is wetted with the ink in an environment of 20° C., for example, by an automatic surface tension meter CBVP-Z (trade name, manufactured by kyowa Interface Science Co., Ltd.).

In addition, in the same consideration as described above, in this embodiment, the viscosity of the black ink composition at 20° C. is preferably 3 to 10 mPa·s and more preferably 3 to 8 mPa·s. In addition, the viscosity measurement may be performed by measuring a shear viscosity at a shear rate of 200 s$^{-1}$ in an environment of 20° C., for example, by a viscoelastic measurement device Physica MCR301 (trade name, manufactured by Anton Paar Japan K.K.).

1.1.10. Application

According to this embodiment, the black ink composition is an ink composition which can suppress the generation of gas-liquid interface foreign materials in long-term printing using a continuous supply type ink storage container and which can provide a printed material excellent in not only continuous printing stability but also image robustness, and a recording medium on which printing is performed is not particularly limited.

1.2. Color Ink Composition

First, as another example of the ink composition of this embodiment, a color ink composition containing a color pigment as the pigment will be described.

In this case, in particular, the color ink composition in this specification includes a yellow ink composition, a magenta ink composition, and a cyan ink composition and furthermore may also be able to use a red, a green, a blue, an orange, and a violet ink composition in order to increase a color reproduction range. Furthermore, besides those ink compositions mentioned above, a black ink composition may also be contained.

1.2.1. Pigment

In this embodiment, as is the pigment of the black ink composition, as the pigment which can be used for the color ink composition, although know pigments, such as an inorganic pigment and an organic pigment, may be used, a self-dispersed pigment which can be dispersed and/or dissolved in water without using a dispersant, a resin coated pigment covered with a dispersion resin, and/or a water-insoluble polymer covered pigment is preferable.

When the pigment contained in the color ink composition of the invention is a self-dispersed pigment having a hydrophilic group on its pigment surface with a phenyl group interposed therebetween, this hydrophilic group preferably represents at least one selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$ (in the formula, M represents a hydrogen atom, an alkali metal, ammonium, or an organic ammonium, and R represents an alkyl group having 1 to 12 carbon atoms or a naphthyl group which may have a substituent).

When the pigment contained in the color ink composition of the invention is a resin coated pigment covered with a dispersion resin, this dispersion resin may be at least one of a graft copolymer in which a polymer chain A is grafted to a polymer chain B and a block copolymer in which one terminal of a polymer chain A is bonded to one terminal of a polymer chain B; the polymer chain A contains 20 to 60 percent by mass of a constituent unit derived from a first cycloalkyl group-containing (meth)acrylate, 10 to 35 percent by mass of a constituent unit derived from (meth) acrylic acid, and 5 to 70 percent by mass of a constituent unit derived from another (meth)acrylate and has a number average molecular weight of 1,000 to 10,000; and the polymer chain B contains at least one of a constituent unit derived from a second cycloalkyl group-containing (meth) acrylate and a constituent unit derived from a vinyl monomer having an aromatic ring or a (meth)acrylate. The mass ratio of the polymer chain A to the polymer chain B (A:B) is preferably 30 to 70:70 to 30, and the number average molecular weights of the graft copolymer and the block copolymer are each preferably 2,000 to 20,000.

The dispersion resin as described above is at least one of a graft copolymer in which the polymer chain A is grafted to the polymer chain B and a block copolymer in which one terminal of the polymer chain A is bonded to one terminal of the polymer chain B. In the graft copolymer, at least one polymer chain A is boded to (branched from) the polymer chain B which is a main chain. In addition, the number of bonds of the polymer chains A to one polymer chain B is not limited. The polymer chain A contains 20 to 60 percent by mass of the constituent unit derived from the first cycloalkyl group-containing (meth)acrylate, 10 to 35 percent by mass of the constituent unit derived from (meth)acrylic acid, and 5 to 70 percent by mass of the constituent unit derived from another (meth)acrylate. A carboxyl group contained in the constituent unit derived from (meth)acrylic acid is ionized when neutralized by an alkali. Hence, the polymer chain A containing the constituent unit derived from (meth)acrylic acid is a polymer chain having a water soluble property.

The polymer chain B contains at least one of the constituent unit derived from the second cycloalkyl group-containing (meth)acrylate and the constituent unit derived from the vinyl monomer having an aromatic ring and also contains, if needed, the constituent unit derived from another (meth)acrylate. This polymer chain B is a water-insoluble polymer chain which is adsorbed and deposited to the pigment by a hydrophobic interaction to cover the pigment (capsule formation). Since the pigment dispersant having the polymer chain A and the polymer chain B, which have different properties from each other, is used, the pigment can be dispersed in a preferable state. In addition, the first cycloalkyl group-containing (meth)acrylate forming the polymer chain A and the second cycloalkyl group-containing (meth)acrylate forming the polymer chain B may be either the same or different from each other. Hereinafter, when the "cycloalkyl group-containing (meth)acrylate" is simply used, this represents both the "first cycloalkyl group-containing (meth)acrylate" and the "second cycloalkyl group-containing (meth)acrylate".

When the above dispersion resin is used, the polymer chain B in the dispersion resin is formed into particles and is stabilized by the polymer chain A since dissolved in an aqueous medium in the ink. Hence, the resin coated pigment covered with this dispersion resin is formed into particles having a high stability, and the viscosity thereof is decreased, so that the dispersion stability of the pigment and the ejection property of the ink are not disturbed. Furthermore, since the amount of a carboxyl group in the polymer chain A is appropriately controlled, the solubility of this pigment dispersant to water is high. Hence, even if the ink is dried at an ink head, for example, the ink can be again easily dissolved and dispersed in another aqueous medium, such as a cleaning liquid.

Polymer Chain A

In the polymer chain A, a cycloalkyl group is contained. Since a pigment dispersant containing the polymer chain A having a cycloalkyl group is used, an aqueous pigment ink capable of recording a printed material which has a high color development, a high saturation, and a high gloss can be prepared. As a particular example of the first cycloalkyl group-containing (meth)acrylate, for example, there may be mentioned cyclohexyl (meth)acrylate, methylcyclohexyl (meth)acrylate, 3,3,5-trimethylcyclohexyl (meth)acrylate, t-butylcyclohexyl (meth)acrylate, cyclohexyloxyethyl (meth)acrylate, tricyclodecyl (meth)acrylate, or isobornyl (meth)acrylate. Among those compounds, cyclohexyl (meth)acrylate or 3,3,5-trimethylcyclohexyl (meth)acrylate is preferable. In addition, the carbon number of the cycloalkyl group is preferably 6 to 9. The reasons for this are that when the carbon number of the cycloalkyl group is 6 to 9, even if many cycloalkyl groups are introduced, the water solubility is not seriously degraded, and this type of compound can be easily available.

When the rate of the constituent unit derived from the first cycloalkyl (meth)acrylate contained in the polymer chain A is less than 20 percent by mass, the effect thereof may not be obtained. On the other hand, when the content described above is more than 60 percent by mass, the water solubility may be seriously degraded in some cases. The rate of the constituent unit derived from the first cycloalkyl (meth) acrylate contained in the polymer chain A is preferably 30 to 50 percent by mass.

In the polymer chain A, the constituent unit derived from (meth)acrylic acid is contained. A carboxyl group in this constituent unit is ionized by neutralization, so that the polymer chain A is dissolved in water. When the rate of the constituent unit derived from (meth)acrylic acid contained in the polymer chain A is less than 10 percent by mass, the polymer chain A may not be dissolved in water in some cases. On the other hand, when the rate described above is more than 35 percent by mass, since the hydrophilic property of the polymer chain A is excessively enhanced, the water resistance of a printed material to be obtained may be seriously degraded in some cases. The content of the constituent unit derived from (meth)acrylic acid is preferably 15 to 25 percent by mass.

In the polymer chain A, the "constituent unit derived from another (meth)acrylate" is contained. As a particular example of another (meth)acrylate, for example, there may be mentioned an aliphatic alkyl (meth)acrylate, such as methyl (meth)acrylate, butyl (meth)acrylate, or dodecyl (meth)acrylate; an aromatic (meth)acrylate, such as phenyl (meth)acrylate or benzyl (meth)acrylate; a hydroxide-containing (meth)acrylate, such as 2-hydroxyethyl (meth)acrylate or 2-hydroxypropyl (meth)acrylate; an ether group-containing (meth)acrylate or an ether chain-containing (meth)acrylate, such as a polyethylene glycol monoalkyl ether (meth)acrylate; or an amino group-containing (meth)acrylate, such as dimethylamino ethyl (meth)acrylate. Those compounds may be used alone, or at least two types thereof may be used in combination.

The number average molecular weight of the polymer chain A is 1,000 to 10,000 and preferably 2,000 to 7,000. When the number average molecular weight of the polymer chain A is less than 1,000, the performance as the polymer may not be obtained. On the other hand, when the number average molecular weight of the polymer chain A is more than 10,000, since the rate of the hydrophilic chain in the pigment dispersant is excessively high, the polymer chain B is promoted to be released from the pigment, and as a result, the dispersion stability of the pigment may be degraded in some cases. In addition, in this specification, the number average molecular weighs of the polymer chain and the polymer are each a polystyrene-converted molecular weight obtained by a gel permeation chromatography (hereinafter, also referred to as "GPC").

Polymer Chain B

The polymer chain B is a water-insoluble polymer chain and has an adsorption property to the pigment. Hence, the polymer chain B is adsorbed to the pigment and deposited on the surface thereof to cover the pigment (capsule formation). As a particular example of the second cycloalkyl group-containing (meth)acrylate, the same compound as that described as the particular example of the first cycloalkyl group-containing (meth)acrylate may be mentioned. The rate of the constituent unit derived from the second cycloalkyl group-containing (meth)acrylate contained in the polymer chain B is preferably 30 to 70 percent by mass and more preferably 40 to 60 percent by mass.

As a particular example of the vinyl monomer having an aromatic ring, for example, there may be mentioned styrene, vinyltoluene, or vinylnaphthalene. In addition, as a particular example of the (meth)acrylate having an aromatic ring, for example, there may be mentioned phenyl (meth)acrylate, naphthoxy (meth)acrylate, benzyl (meth)acrylate, phenoxyethyl (meth)acrylate, or paracumylphenol ethylene oxide-modified (meth)acrylate. The rate of the constituent unit derived from the vinyl monomer having an aromatic ring or the (meth)acrylate contained in the polymer chain B is preferably 30 to 70 percent by mass and more preferably 40 to 60 percent by mass.

In addition, in order to soften the polymer chain B and/or to introduce therein a functional group, such as a hydroxide, the above "constituent unit derived from another (meth) acrylate" is preferably contained in the polymer chain B.

The number average molecular weights of the graft copolymer and the block copolymer to be used as the pigment dispersant are each 2,000 to 20,000, preferably 5,000 to 15,000, and further preferably 7,000 to 12,000. When the number average molecular weight is less than 2,000, the function as the pigment dispersant is degraded, and the dispersion stability cannot be maintained. On the other hand, when the number average molecular weight is more than 20,000, the viscosity of an aqueous pigment dispersion liquid is increased, or one molecular chain is adsorbed to a plurality of pigment grains, so that the pigment is not likely to be dispersed in some cases.

When the rate of the polymer chain A, which is a hydrophilic chain, contained in the graft copolymer or the block copolymer is too low, the pigment dispersant is insoluble in water or is precipitated. On the other hand, when the rate of the polymer chain A is too high, the water resistance of a printed material to be recorded is degraded, or the adsorption property to the pigment is degraded. In addition, when the rate of the polymer chain B, which is a hydrophobic chain, contained in the graft copolymer or the block copolymer is too low, the pigment dispersant is not stably adsorbed to the pigment. On the other hand, when the rate of the polymer chain B is too high, the pigment dispersant is insoluble in water or is separated therefrom. Hence, the mass ratio A:B of the polymer chain A to the polymer chain B is 30 to 70:70 to 30, preferably 40 to 60:60 to 40, and further preferably 45 to 55:55 to 45.

In addition, in this embodiment, the color ink composition may use a pigment covered with a water-insoluble polymer.

The water-insoluble polymer as described above is a polymer obtained by a solution polymerization method using at least a polymerizable unsaturated monomer and a polymerization initiator, and the water-insoluble polymer represents a polymer in which the solubility with respect to 100 g of water at 25° C. is less than 1 g after neutralization.

As the polymerizable unsaturated monomer, for example, there may be mentioned a vinyl aromatic hydrocarbon, a methacrylic acid ester, methacrylamide, an alkyl-substituted methacrylamide, maleic anhydride, a vinyl cyanide compound, methyl vinyl ketone, or vinyl acetate. In particular, there may be mentioned styrene, α-methylstyrene, vinyltoluene, 4-t-butylstyrene, chlorostyrene, vinylanisole, vinylnaphthalene, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, acrylonitrile, or methacrylonitrile. Those compounds may be used alone, or at least two types thereof may be used by mixing.

Furthermore, in order to impart the glossiness to a printed image, the water-insoluble polymer preferably contains a monomer having a hydrophilic group and a monomer having a salt-forming group.

As the monomer having a hydrophilic group, for example, a polyethylene glycol monomethacrylate, a polypropylene glycol monomethacrylate, an ethylene glycol/propylene glycol monomethacrylate may be mentioned. Those compounds may be used alone, or at least two types thereof may be used by mixing. In particular, when a monomer component, such as a polyethylene glycol (2 to 30) monomethacrylate, a polyethylene glycol (1-15)/propylene glycol (1-15) monomethacrylate, a polypropylene glycol (2 to 30) monomethacrylate, a methoxy polyethylene glycol (2 to 30) monomethacrylate, a methoxy polytetramethylene glycol (2 to 30) monomethacrylate, or a methoxy(ethylene glycol/polypropylene copolymer) (1 to 30) methacrylate, forming a branched chain is used, the glossiness of a printed image is further improved.

As the monomer having a salt-forming group, for example, acrylic acid, methacrylic acid, styrene carboxylic acid, or maleic acid may be mentioned, and those compounds may be used alone, or at least two types thereof may be used by mixing.

Furthermore, a macromonomer, such as a styrene macromonomer or a silicone macromonomer, having a polymerizable functional group at one terminal, or another monomer may also be used together.

An organic pigment covered with a water-insoluble polymer is obtained by a phase inversion emulsification method. That is, after the above water-insoluble polymer is dissolved in an organic solvent, such as methanol, ethanol, isopropyl alcohol, n-butanol, acetone, methyl ethyl ketone, or dibutyl ether, and an organic pigment is added to the solution thus obtained, a kneading/dispersing treatment is performed by addition of a neutralizer and water to prepare an oil-in-water type dispersion, and the organic solvent is removed from the dispersion thus obtained, so that an aqueous dispersion can be obtained. The kneading/dispersing treatment may be performed, for example, using a ball mill, a roll mill, a bead mill, a high-pressure homogenizer, or a high-speed stirring dispersing device.

In addition, in order to stably disperse a colorant, and in particular, the pigment, as the water-insoluble polymer used for covering, a polymer having a weight average molecular weight of 10,000 to 150,000 is preferable. The weigh average molecular weight may be measured by a molecular weight analysis method using a gel permeation chromatography (GPC).

As a pigment used as a raw material of the above self-dispersed pigment, resin coated pigment, and water-insoluble polymer covered pigment, each of which is used for the color ink composition, besides the pigments, such as Pigment Yellow, Pigment Red, Pigment Violet, Pigment Blue, or Pigment Black, described in Color Index, a phthalocyanine-based, an azo-based, an anthraquinone-based, an azomethine-based, or a condensed ring-based pigment may also be mentioned. In addition, for example, there may also be mentioned an organic pigment, such as Yellow No. 4, No. 5, No. 205, or No. 401, Orange No. 228 or No. 405, or Blue No. or No. 404; or an inorganic pigment, such as titanium oxide, zinc oxide, zirconium oxide, iron oxide, ultramarine, prussian blue, or chromium oxide.

In particular, for example, there may be mentioned C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, or 198; C.I. Pigment Red 1, 3, 5, 8, 9, 16, 17, 19, 22, 38, 57:1, 90, 112, 122, 123, 127, 146, or 184; C.I. Pigment Violet 1, 3, 5:1, 16, 19, 23, or 38; or C.I. Pigment Blue 1, 2, 15, 15:1, 15:2, 15:3, 15:4, or 16. In particular, the organic pigment contained in a yellow ink composition preferably contains at least one of C.I. Pigment Yellow 74, 109, 110, 128, 138, 147, 150, 155, 180, and 188; the organic pigment contained in a magenta ink composition preferably contains at least one of C.I. Pigment Red 122, 202, 207, 209, and C.I. Pigment Violet 19; and the organic pigment contained in a cyan ink composition preferably contains at least one of C.I. Pigment Blue 15, 15:1, 15:2, 15:3, 15:4, and 16.

On the other hand, the self-dispersed pigment of the color ink composition is manufactured by bonding a hydrophilic group to a pigment surface with a phenyl group interposed therebetween. As a surface treatment method in which the above functional group, which is a hydrophilic group, or its salt is bonded to a pigment surface with a phenyl group interposed therebetween, various known surface treatment methods may be used, and for example, there may be mentioned a method in which by bonding sulfanilic acid, p-aminobenzoic acid, 4-aminosalicylic acid, or the like to a pigment surface, a hydrophilic group is bonded thereto with a phenyl group interposed therebetween.

In addition, as the self-dispersed pigment of the color ink composition, a commercially available product may also be used, and for example, CAB-O-JET 250C, CAB-O-JET 260M, or CAB-O-JET 270Y (each of which is manufactured by Cabot Corp.) may be mentioned.

In addition, the resin coated pigment of the color ink composition may be obtained, for example, by a manufacturing method described in JP-A-2013-166867. In addition, as the water-insoluble polymer covered pigment and the self-dispersed pigment, for example, materials obtained by the manufacturing method described in JP-A-2011-178916 may also be used.

In addition, the resin coated pigment and the water-insoluble polymer covered pigment are also each called a capsule type pigment, and the pigment surface thereof may be covered either partially or fully with the resin.

1.2.2. Others

In addition, in this embodiment, as is the black ink composition, although the color ink composition includes at least an organic compound and water, since the particular examples and the addition amounts thereof are similar to those of the black ink composition, description thereof will be omitted.

Furthermore, in this embodiment, as is the black ink composition, if needed, other additives may also be added to the color ink composition. Since the particular examples thereof are similar to those of the black ink composition, description thereof will be omitted. In addition, in this embodiment, since the physical properties of the color ink composition are similar to those of the black ink composition, description thereof will be omitted.

1.3. Ink Set

An ink set according to this embodiment includes at least one of the above ink compositions according to this embodiment, and the ink composition includes at least one type of ink composition selected from the group consisting of a black ink composition and a color ink composition.

By the ink set according to this embodiment, even in long-term printing using a continuous supply type ink storage container to which the ink is replenished, the generation of gas-liquid interface foreign materials is suppressed, and a printed material excellent in not only continuous printing stability but also image robustness can be obtained.

In addition, in this embodiment, the ink set is an ink set which includes, among the ink compositions according to this embodiment, at least one of the black ink composition and the color ink composition, and the pigment contained in the black ink composition and the color ink composition may be a self-dispersed pigment or a resin coated pigment.

That is, when the ink set according to this embodiment is formed to include no color ink composition but a plurality of black ink compositions having different pigment concentrations, this ink set may be applied to an ink jet recording device capable of using a monochrome printing mode. In addition, when the ink set according to this embodiment is formed to include both the color ink composition and the black ink composition, this ink set may be applied to an ink jet recording device capable of using both a monochrome printing mode and a color printing mode.

As described above, in the ink composition according to this embodiment, the pigment contained in the ink composition is preferably at least one type selected from the group consisting of a self-dispersed pigment having a hydrophilic group on a pigment surface, a self-dispersed pigment having a hydrophilic group on a pigment surface with a phenyl group interposed therebetween, and a resin coated pigment covered with a dispersion resin or a water-insoluble polymer. As the ink set described above, for example, there may be mentioned (1) a combination of ink compositions in which the black ink composition contains a self-dispersed pigment and the color ink composition contains a resin coated pigment, (2) a combination of ink compositions in which the black ink composition contains a self-dispersed pigment and the color ink composition also contains a self-dispersed pigment, (3) a combination of ink compositions in which the black ink composition contains a resin coated pigment and the color ink composition also contains a resin coated pigment, (4) a combination including as the black ink composition, an ink composition containing a self-dispersed pigment and an ink composition containing a resin coated pigment, (5) a combination including as the color ink composition, an ink composition containing a self-dispersed pigment and an ink composition containing a resin coated pigment.

According to this embodiment, since the ink set according to this embodiment is formed to include at least one ink composition according to this embodiment, in long-term printing using a continuous supply type ink storage container, the generation of gas-liquid interface foreign materials is suppressed, and a printed material excellent in not only continuous printing stability but also image robustness can be obtained.

1.4. Ink Jet Recording Device

An ink jet recording device according to this embodiment includes: an ink storage container receiving the above ink set according to this embodiment; a print head ejecting the above ink composition according to this embodiment, and an ink supply flow path supplying the ink composition to the print head from the ink storage container. That is, in the ink jet recording device according to this embodiment, the ink storage container has an ink chamber to which the ink composition can be replenished and an openable ink inlet.

Hereinafter, the ink jet recording device according to this embodiment will be described in detail with reference to the drawings. In addition, in order to facilitate the understanding of the structure of the ink jet recording device according to this embodiment, the scale may be appropriately changed in some cases.

1.4.1. Appearance

Figure 2:
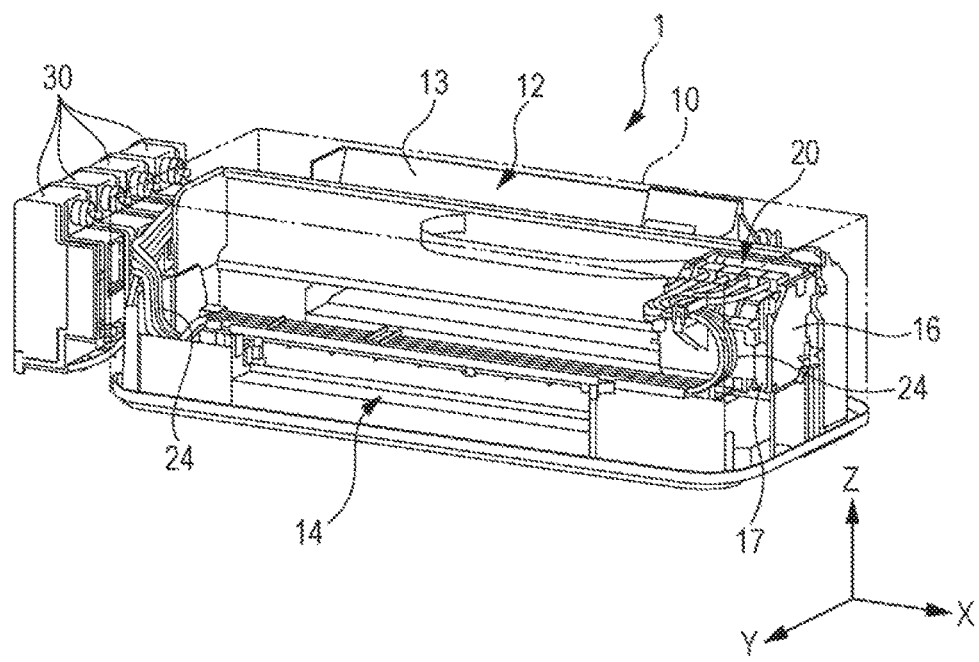
FIG. 2 is a schematic perspective view of the ink jet recording device according to the embodiment of the invention and shows the state in which the container receiving case is removed.

FIG. 1 is a schematic perspective view of an ink jet recording device 1. In particular, FIG. 1 shows the state in which ink storage containers 30 (see FIG. 3) are received in a container receiving case 51. FIG. 2 shows the state in which the container receiving case 51 is removed. In FIGS. 1 and 2, X, Y, and Z axes orthogonal to each other are shown. The X, Y, and Z axes of FIG. 1 correspond to X, Y, and Z axes of another figure, respectively, and whenever necessary, the X, Y, and Z axes are also shown in the following drawings. In this embodiment, the X axis corresponds to a move direction of a carriage 16, and the Y axis corresponds to a direction in which a plurality of ink storage containers 30 is arranged in a use state. The Z axis corresponds to a vertical direction (gravity direction).

Figure 3:
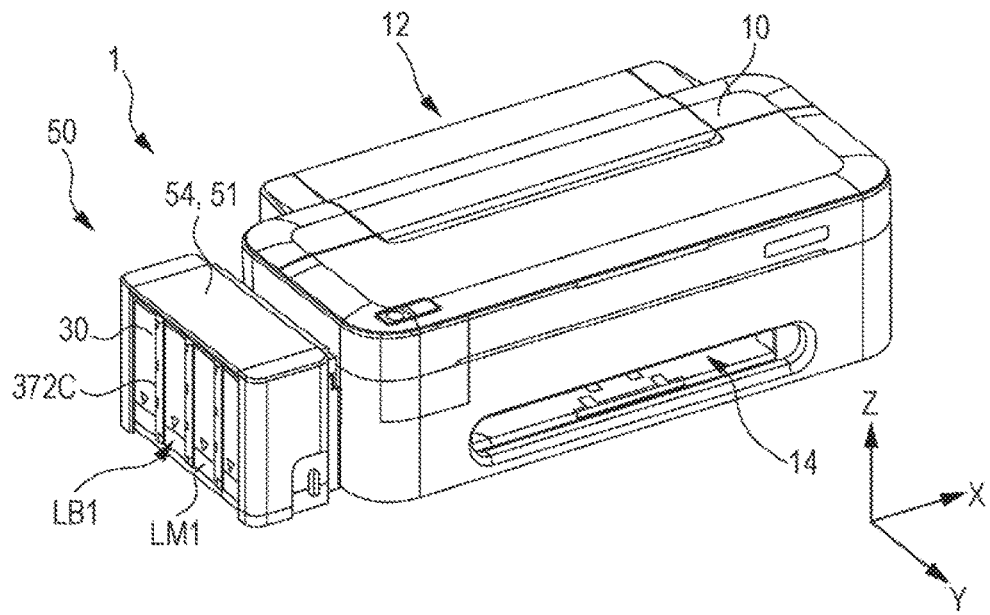
FIG. 3 is a schematic perspective view of a recording unit of the ink jet recording device according to the embodiment of the invention received in a recording unit receiving case and shows the state in which the ink jet recording device is in a use state.
Figure 4:
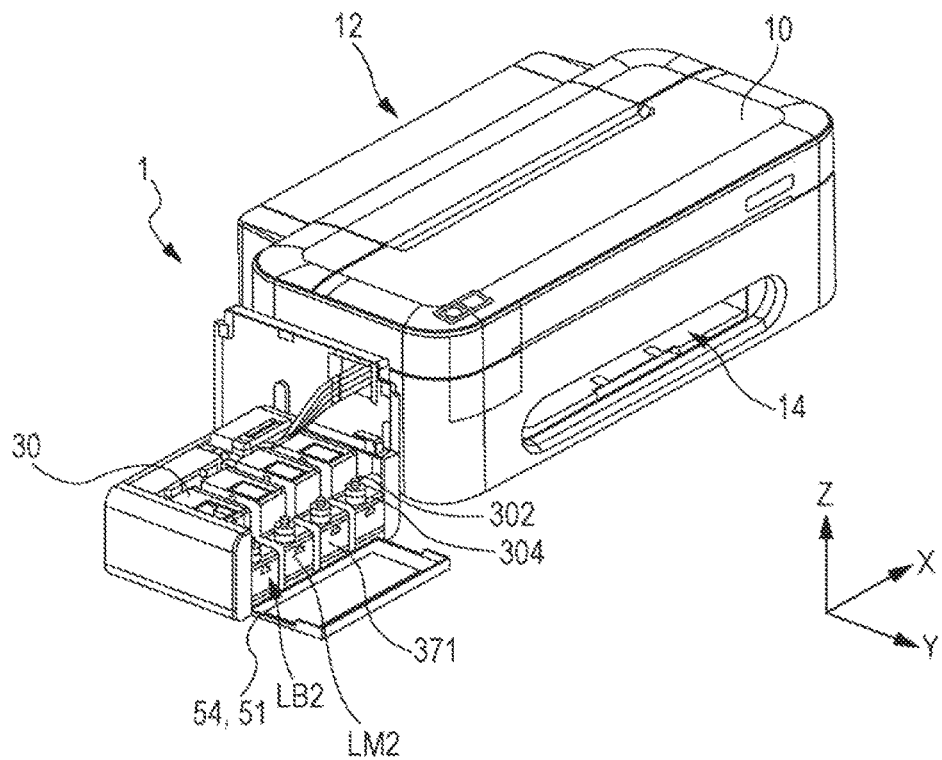
FIG. 4 is a schematic perspective view of the recording unit of the ink jet recording device according to the embodiment of the invention received in the recording unit receiving case and shows the state in which the ink jet recording device is in a charge state.

FIGS. 3 and 4 are each a schematic perspective view showing the state in which a recording unit 12 of the ink jet recording device 1 is received in a recording unit receiving case 10. In particular, FIG. 3 shows a use state (to be described later) of the ink jet recording device 1, and FIG. 4 shows a charge state (to be described later) of the ink jet recording device 1.

As shown in FIGS. 1 to 4, the ink jet recording device 1 includes the recording unit 12 recording an image on a recording medium (not shown) and an ink receiving unit 50 supplying the ink to a subtank 20 of the recording unit 12 through an ink supply pipe (ink supply flow path) 24.

1.4.2. Recording Unit

The recording unit 12 includes a print head 17 recording an image on a recording medium by ejecting liquid droplets of the above ink composition, the subtank 20 which temporarily stores the ink supplied through the ink supply pipe, the carriage 16 capable of performing a reciprocal movement in the X axis direction while mounting the subtank 20 and the print head 17, a paper charge port 13 to which a recording medium is charged, and a paper discharge port 14 from which a recording medium is discharged. The recording unit 12 is received in the recording unit receiving case 10 as shown in FIGS. 3 and 4.

The print head 17 has a nozzle surface (not shown) provided at a position facing a recording surface of a recording medium, and an ink in the form of liquid droplets is ejected from a plurality of nozzles (not shown) provided in the nozzle surface so as to be adhered to the recording surface of the recording medium.

As an ink jet recording method, although various methods as described below may be mentioned, any method may be used. For example, there may be used a method (electrostatic suction method) in which a strong electric field is applied between a nozzle and an accelerating electrode provided in front of the nozzle so that an ink in the form of liquid droplets is continuously ejected from the nozzle, and while the ink liquid droplets fly between deflection electrodes, a print information signal is applied thereto for recording, or without deflecting the ink liquid droplets, the ejection thereof is performed in accordance with the print information signal; a method in which an ink liquid is pressurized by a small pump, and a nozzle is mechanically vibrated by a quartz oscillator or the like so as to forcibly eject ink liquid droplets; a method (piezoelectric method) in which a pressure and a print information signal are simultaneously applied to an ink by a piezoelectric element, so that ink liquid droplets are ejected and recorded; and a method (thermal jet method) in which an ink is heated using small electrodes in accordance with a print information signal to form bubbles, so that ink droplets are ejected and recorded.

The subtank 20 is connected to the ink storage container 30 with the ink supply pipe 20 interposed therebetween, temporarily stores the ink stored in the ink storage container 30, and then supplies the ink to the print head 17. In the example shown in FIGS. 2 and 3, as the subtank 20, four subtanks 20Bk, 20Cn, 20Ma, and 20Yw are provided so as to correspond to the respective colors stored in the ink storage containers 30. Although a material forming the subtank 20 is not particularly limited, for example, a synthetic resin, such as a polystyrene or a polyethylene, may be mentioned. In addition, in this embodiment, although the ink jet recording device 1 having the subtank 20 has been described by way of example, the ink jet recording device is not limited thereto, and for example, the structure in which the print head 17 and the ink storage container 30 are directly connected to each other through the ink supply pipe 24 without using the subtank 20 may also be used.

The carriage 16 mounts the print head 17 and the subtanks 20 and is moved reciprocally along the X axis by a carriage movement mechanism (not shown) which is formed of a motor, a timing belt, and the like. In accordance with the movement of the carriage 16 as described above, since the print head 17 also moves reciprocally in the X axis direction, recording of an image on a recording medium in the X axis direction is performed by ejection of the ink of the print head 17 in association with the movement of the carriage 16. In this embodiment, although a so-called serial head type ink jet recording device is described by way of example, the ink storage container is not limited thereto and may also be applied to a so-called line head type ink jet recording device.

The paper discharge port 14 is provided at a front surface side of the ink jet recording device 1. In addition, the paper charge port 13 is provided at a rear surface side of the ink jet recording device 1. When a recording operation is performed after a recording medium is set in the paper charge port 13, the recording medium is charged through the paper charge port 13, and after an image or the like is recorded inside, printed paper is discharged from the paper discharge port 14. The transportation of the recording medium can be performed by a paper feed mechanism (not shown) configured to feed paper in the Y axis direction. As described above, recording of an image on the recording medium in the Y axis direction can be performed by ejection of the ink of the print head 17 in association with the movement of the recording medium by the paper feed mechanism.

The recording unit 12 has a control portion (not shown) controlling the entire operation of the ink jet recording device 1. The control portion may include, for example, a CPU, a ROM, and a RAM. The control portion controls all the operations, such as an operation of reciprocally moving the carriage 16, an operation of feeding a recording medium, an operation of ejecting the ink from the print head 17, and an operation of supplying the ink from the ink storage container 30 to the subtank 20 (print head 17).

1.4.3. Ink Receiving Unit and Ink Supply Pipe

The ink receiving unit 50 includes a plurality of ink storage containers 30 and the container receiving case receiving the ink storage containers 30. The ink receiving unit 50 is provided outside of the recording unit receiving case 10. The container receiving case 51 can be detached from a side surface of the recording unit receiving case 10 while the ink storage containers 30 are held. In addition, the container receiving case 51 has an openable upper surface case 54.

When the front surface of the ink jet recording device 1 is viewed (from +Y axis direction to −Y axis direction), the ink receiving unit 50 is provided adjacent to a left side surface of the recording unit receiving case (at a −X axis direction side of the recording unit receiving case 10). As described above, since the ink receiving unit 50 is provided outside of the recording unit receiving case 10, compared to the case in which the ink receiving unit 50 is provided in the receiving case 10 together with the recording unit 12, a spatial limitation can be reduced. Hence, the continuous supply type ink storage container 30 can be provided. The ink storage container 30 is able to store a large amount of the ink as compared to that of the subtank 20.

The ink supply pipes 24 are provided for the respective ink storage containers 30 to connect the ink storage containers 30 to the respective subtanks 20 (print heads 17), so that the ink supply pipes 24 each partially form an ink flow path supplying the ink in the ink storage container 30 to the corresponding subtank 20 (print head 17). As the ink supply pipe 24, for example, a flexible tube-shaped member (such as a rubber or an elastomer) may be used. When the ink of the subtank 20 is consumed by ejection thereof from the print head 17, the ink in the ink storage container 30 is supplied to the subtank 20 through the ink supply pipe 24. Hence, the ink jet recording device 1 is able to continue recording for a long time.

In the ink supply pipe 24, a filter (not shown) may be provided. The filter provided in the ink supply pipe 24 traps agglomerates generated in an ink chamber 340 (see FIG. 5) and suppresses the agglomerates from flowing into the print head 17.

The ink storage containers 30 are provided for the respective ink compositions or the respective colors. In the example shown in FIGS. 1 to 4, four ink storage containers 30 are provided for the respective subtanks 20Bk, 20Cn, 20Ma, and 20Yw. In this embodiment, although the four ink storage containers 30 are provided for respective different colors, by separating the inside of one ink storage container with walls, a plurality of ink storage portions may be provided. In the ink storage container 30, for example, the ink storage portions described above may be provided. Hereinafter, the structure of the ink storage container 30 will be described in detail.

1.4.4. Structure of Ink Storage Container Position of Ink Storage Container

The structure of the ink storage container 30 will be described in detail, and first of all, the position of the ink storage container 30 will be described.

As the position of the ink storage container 30, there are a use state and a charge state. The "use state" indicates a position of the ink storage container 30 when the ink is charged in the print head 17 (subtank 20). When there is a plurality of positions at which the ink can be charged, if a position at which the ink is to be charged is recommended in its manual or illustration, the above position is regarded as the use state, and in the ink jet recording device, when there is a member fixing the ink storage container 30, the position thereof fixed by the member is regarded as the use state. FIG. 3 shows one example of the use state of the ink storage container 30. Although not shown in FIG. 3, when the ink storage container 30 is in the use state, an ink inlet 304 (see FIG. 4) faces a side surface of the recording unit receiving case 10. That is, the axis of the ink inlet 304 faces in a horizontal direction (in particular, +X axis direction). In addition, in this state, the ink inlet 304 is blocked by a plug member 302 (see FIG. 4).

The "charge state" indicates a position of the ink storage container 30 when the ink is charged (filled or replenished) in the ink storage container 30 (ink chamber 340). FIG. 4 shows the charge state of the ink storage container 30. When the ink is charged in the ink storage container 30, a user detaches the container receiving case from the side surface of the recording unit receiving case 10, then opens the upper surface case 54, and sets the ink storage container 30 in the charge state shown in FIG. 4. In the charge state, the axis of the ink inlet 304 is along a vertical direction (in particular, +Z direction). After the user sets the ink storage container 30 in the charge state shown in FIG. 4, the plug member 302 blocking the ink inlet 304 is removed, and the ink is then charged. After the ink is charged, the user blocks the ink inlet 304 with the plug member 302. Subsequently, the user fits the container receiving case 51 to the side surface of the recording unit receiving case 10, so that the container receiving case 51 is again set in the use state shown in FIG. 3.

State Identification Portion

In the use state shown in FIG. 3, of a wall 370 (to be described later) defining the ink chamber 340 in the ink storage container 30, a third side surface 372C can be viewed from the outside. In the use state shown in FIG. 3, the third side surface 372C is orthogonal to a horizontal (parallel to the XY plane) setting plane. On the other hand, in the charge state shown in FIG. 4, the third side surface 372C is parallel to the setting plane. That is, in the charge state, the third side surface 372C forms a bottom surface of the ink storage container 30 (ink chamber 340).

As shown in FIG. 3, a first state identification portion LB1 (also called "replenishment start identification portion LB1") is provided in the third side surface 372C. The first state identification portion LB1 is used in the use state so as to enable the user to identify a first state in which the ink is to be replenished in the ink storage container 30. In particular, the first state identification portion LB1 is provided to identify that in the use state, the ink in the ink storage container 30 is consumed, and an inside ink liquid level reaches a first height. The first state identification portion LB1 includes a straight line LM1 (also called "first state display line LM1" or "replenishment start display line LM1") which is set in a horizontal direction (parallel to the XY plane) in the use state. The user replenishes the ink in the ink storage container 30 (ink chamber 340) when the ink liquid level reaches the vicinity of the first state display line LM1.

In the charge state shown in FIG. 4, when the user opens the upper surface case 54, of the wall 370 (to be described later) defining the ink chamber 340, an upper surface 371 different from the third side surface 372C can be viewed from the outside. In the charge state, the upper surface 371 is a wall orthogonal to the setting plane parallel to the XY plane. On the other hand, in the use state shown in FIG. 3, the upper surface 371 forms an upper surface of the ink chamber 340 (see FIGS. 5 and 6).

In the upper surface 371, a second state identification portion LB2 (also called "replenishment complete identification portion LB2) is provided. The second state identification portion LB2 is used in the charge state to enable the user to identify a second state in which charge of the ink in the ink storage container 30 is completed. In particular, the second state identification portion LB2 is provided to identify that in the charge state, the ink is replenished in the ink storage container 30, and the inside ink liquid level reaches a second height. The second state identification portion LB2 includes a straight line LM2 (also called "second state display line LM2" or "replenishment complete display line LM2") which is set in a horizontal direction in the charge state. The user stops the replenishment of the ink when the ink liquid level reaches the vicinity of the second state display line LM2.

In this embodiment, as shown in FIGS. 3 and 4, although the case in which the position of the ink storage container 30 in the use state is different from that in the charge state is shown, the position of the ink storage container 30 is not limited thereto, and for example, the position of the ink storage container 30 in the use state may be set equal to the position thereof in the charge state. Accordingly, the generation of agglomerates caused by the ink can be further suppressed. That is, when the position of the ink storage container 30 in the use state is set different from the position thereof in the charge state, the ink in the ink chamber 340 may adhere to a portion (such as a part of the wall 370 defining the ink chambers 340) with which the ink has not be in contact before. When the ink which adheres to the portion described above is in contact with the air and forms a gas-liquid interface, the generation of agglomerates may be caused thereby. On the other hand, when the position of the ink storage container 30 in the use state is not changed from the position thereof in the charge state, the ink can be suppressed from newly adhering to the portion with which the ink has not been in contact before, and hence, the generation of agglomerates in the ink chamber 340 tends to be suppressed.

When the position of the ink storage container 30 in the use state is set equal to the position thereof in the charge state, for example, the position of the ink storage container 30 shown in FIG. 3 may be used in the use state and also in the charge state. In this case, the ink inlet 304 may be provided at a position at which the ink is not allowed to flow out in the charge state, and for example, when an ink inlet 304 having an upward opening in a vertical direction is provided at an upper portion (such as the upper surface 371 of the wall 370 which will be described later) of the ink storage container 30, the ink can be prevented from flowing out when the ink is charged.

Flow Path of Ink and Air

Figure 5:
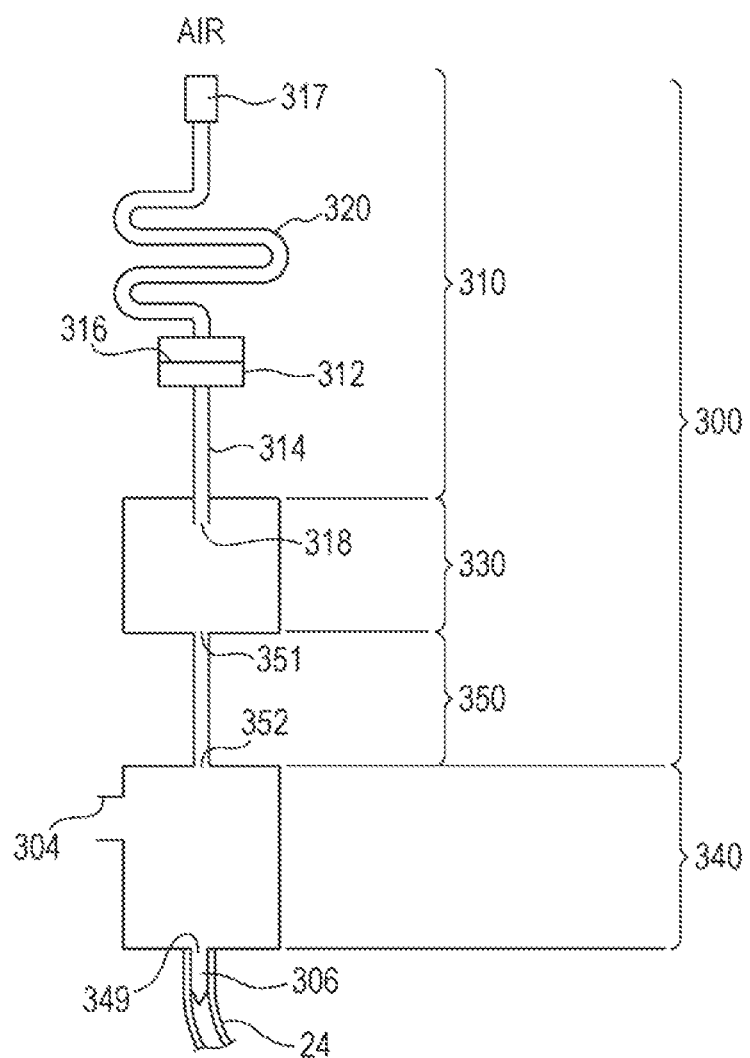
FIG. 5 is a schematic view showing a path from an air opening port to an ink discharge portion of the ink jet recording device according to the embodiment of the invention.

Next, a supply path of the ink in the ink jet recording device 1 according to this embodiment will be described. FIG. 5 is a schematic view showing a path from an air opening port 317 to an ink discharge portion 306.

The path (flow path) from the air opening port 317 to the ink discharge portion 306 is roughly divided into an air opening flow path 300 and the ink chamber 340. The air opening flow path 300 is formed of a first flow path 310, an air chamber 330, and an ink chamber communication path 350 in this order from an upstream side. In the air opening flow path 300, an air introduction port 352 which is one end thereof is opened to the ink chamber 340, and the air opening port 317 which is the other end is opened to the outside. That is, the air opening port 317 communicates with the air. In the use state, in the ink chamber communication path 350 (in particular, in the vicinity of the air introduction port 352), a liquid surface in direct contact with the air is formed, and air (air bubbles) is introduced from the air introduction port 352 into the ink in the ink chamber 340, so that air is introduced into the ink chamber 340.

In the first flow path 310, an air inlet 318 (also called "air chamber opening 318") which is one end thereof is opened to the air chamber 330, and the air opening port 317 which is the other end is opened to the outside, so that the air chamber 330 communicates with the outside. The first flow path 310 includes a communication flow path 320, a gas-liquid separation chamber 312, and a communication flow path 314. In the communication flow path 320, one end thereof is connected to the air opening port 317, and the other end is connected to the gas-liquid separation chamber 312. A part of the communication flow path 320 is a long and thin flow path and suppresses moisture of the ink stored in the ink chamber 340 from evaporating outside through the air opening flow path 300 by diffusion. At a portion between an upstream side and a downstream side of the gas-liquid separation chamber 312, a sheet member (film member) 316 is provided so as to block the flow path. This sheet member 316 is likely to allow a gas to pass but not likely to allow a liquid to pass. For the sheet member 316, for example, Gore-Tex (registered trade name) may be used. When this sheet member 316 is provided so as to block the path (flow path) from the air inlet 318 to the air opening port 317, the ink flowing back from the ink chamber 340 is suppressed from flowing to an upstream side than the sheet member 316. This sheet member 316 functions as a gas-liquid separation membrane.

The gas-liquid separation chamber 312 communicates with the air chamber 330 through the communication flow path 314. In this case, one end of the communication path 314 is the air inlet 318. The air chamber 330 has a large flow-path cross-sectional area as compared to that of the ink chamber communication path 350 and has a predetermined volume. Accordingly, the air chamber 330 can store the ink flowing back from the ink chamber 340 and can also suppress the ink from flowing to an upstream side than the air chamber 330.

In the ink chamber communication path 350, since an air chamber side opening 351 which is one end thereof is opened to the air chamber 330, and the air introduction port 352 which is the other end is opened to the ink chamber 340, the air chamber 330 communicates with the ink chamber 340. In addition, the ink chamber communication path 350 preferably has a small flow-path cross-sectional area so as to be able to form a meniscus (liquid surface crosslinking).

The ink chamber 340 stores the ink and enables the ink to flow from an ink outlet 349 of the ink discharge portion 306 to the subtank 20 (see FIGS. 1 and 2) through the ink supply pipe 24.

Figure 6:
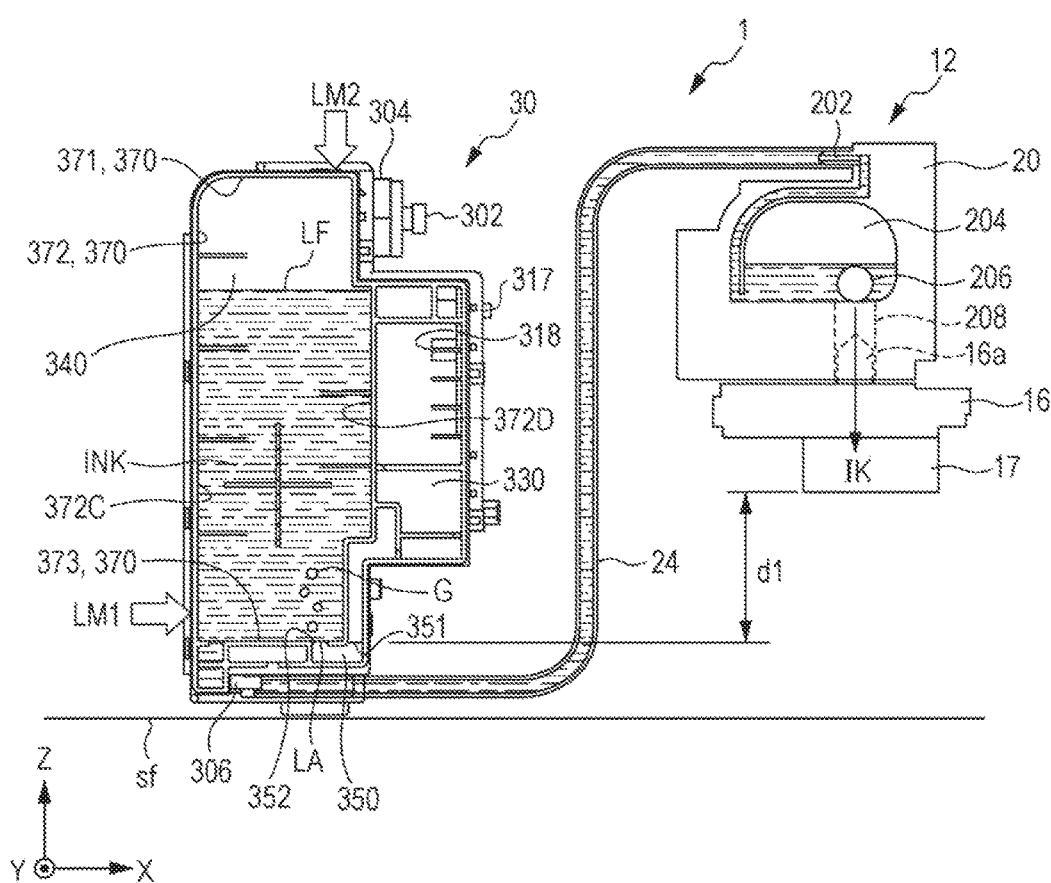
FIG. 6 is a schematic perspective view showing a part of an internal structure of the ink jet recording device according to the embodiment of the invention.

Next, the principle of supplying the ink from the ink storage container 30 to the subtank 20 (print head 17) will be described with reference to FIG. 6. FIG. 6 is a schematic view showing a part of an internal structure of the ink jet recording device 1. The ink storage container 30 of this embodiment supplies the ink to the recording unit 12 using Mariotte's bottle principal.

In the example shown in FIG. 6, the ink jet recording device 1 is placed on a horizontal surface sf (XY plane). The ink discharge portion 306 of the ink storage container 30 and an ink receiving portion 202 of the subtank 20 are connected to each other with the ink supply pipe 24 interposed therebetween.

In the example shown in FIG. 6, the subtank 20 includes an ink storage chamber 204, an ink flowing path 208, and a filter 206. In the ink flowing path 208, an ink supply needle 16a of the carriage 16 is inserted. The filter 206 traps agglomerates which may be mixed in the ink in some cases so as to prevent the agglomerates from flowing into the print head 17. The ink in the ink storage chamber 204 is supplied to the print head 17 through the ink flowing path 208 and the ink supply needle 16a by suction from the print head 17. The ink supplied in the print head 17 is ejected to the outside (recording medium) through a nozzle (not shown).

After the ink is charged in the ink chamber 340 through the ink inlet 304 in the charge state (see FIG. 4), when the ink inlet 304 is tightly sealed with the plug member 302, and the ink chamber 340 is placed in the use state, the air in the ink chamber 340 is expanded, so that the inside of the ink chamber 340 is at a reduced pressure. Furthermore, since the ink in the ink chamber 340 is sucked from the print head 17, the reduced pressure in the ink chamber is maintained.

In the use state, the air introduction port 352 is located at a position lower than the first state display line LM1. In the example shown in FIG. 6, of the wall 370 defining the ink chamber 340, the air introduction port 352 is formed in a bottom surface 373 of the ink chamber 340 in the use state. Accordingly, even when the ink in the ink chamber 340 is consumed, and the liquid surface of the ink chamber 340 is lowered, a liquid surface (air contact liquid surface) LA in direct contact with the air is maintained at a constant level over a long time (time approximately required for that the ink liquid surface reaches the first state display line LM1). In addition, in the use state, the air introduction port 352 is placed at a position lower than that of the print head 17. Accordingly, a water head difference d1 is generated. In addition, in the use state, the water head difference d1 in the state in which the air contact liquid surface LA, which is a meniscus, is formed in the vicinity of the air introduction port 352 of the ink chamber communication path 350 is also called a "steady state water head difference d1".

Since the ink in the ink storage chamber 204 is sucked by the print head 17, the ink storage chamber 204 is set at a predetermined reduced pressure or lower than that. When the ink storage chamber 204 is set at a predetermined reduced pressure or lower than that, the ink in the ink chamber 340 is supplied to the ink storage chamber 204 through the ink supply pipe 24. That is, in the ink storage chamber 204, the amount of the ink flowing in the print head is automatically replenished from the ink chamber 340. In other words, compared to the water head difference d1 generated by the difference between the air contact liquid surface LA and the height of the print head 17 (in particular, the nozzle) in a vertical direction, the suction force (reduced pressure) from the printer side is large to a certain extent, and hence, the ink is supplied from the ink chamber 340 to the ink storage chamber 204.

When the ink in the ink chamber 340 is consumed, the air in the air chamber 330 is introduced into the ink chamber 340 in the form of air bubbles G through the ink chamber communication path 350. Accordingly, a liquid surface LF (ink liquid surface LF) of the ink chamber 340 is lowered. On the other hand, since the height of the air contact liquid surface LA in direct contact with the air is maintained constant, the water head difference d1 is maintained constant. That is, by a predetermined suction force of the print head 17, the ink can be stably supplied from the ink storage container 30 to the print head 17.

In FIG. 6, at a boundary portion at which the ink liquid surface LF and the inside of the wall 370 defining the ink chamber 340 are in contact with each other, an ink thin film is liable to be formed. Since the ink thin film formed at the boundary portion is liable to be dried, when the ink thin film falls from the wall surface, agglomerates may be generated thereby.

Structure of Ink Storage Container

Figure 7:
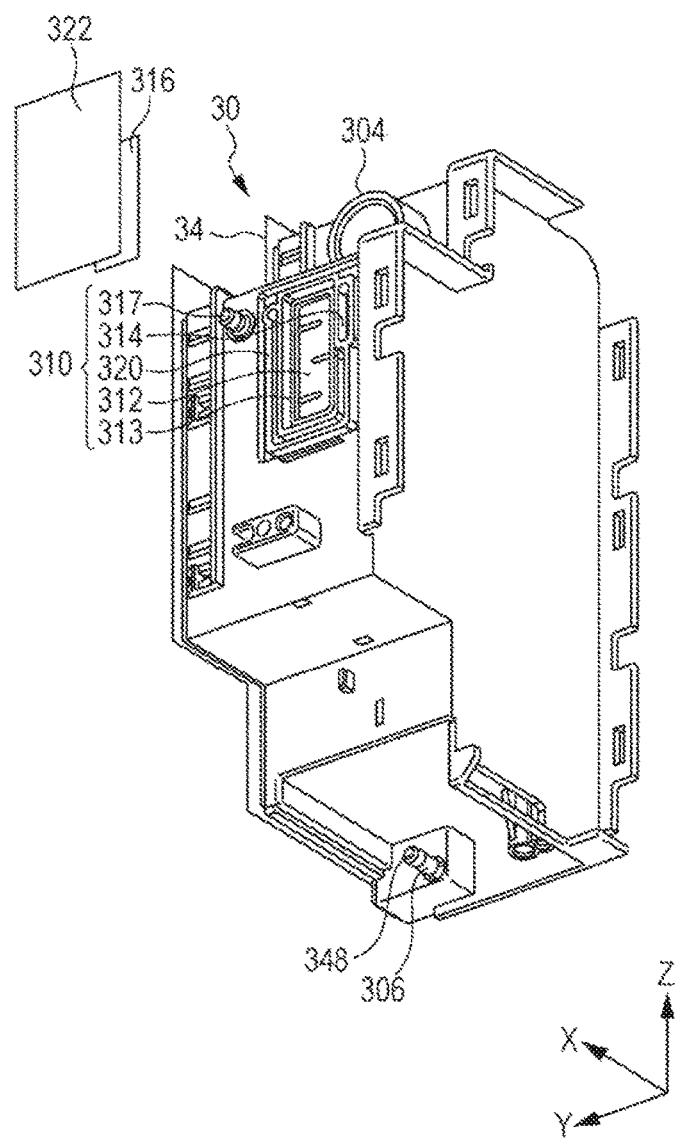
FIG. 7 is a schematic perspective view of the appearance of the ink storage container according to the embodiment of the invention.

FIG. 7 is a perspective view schematically showing the appearance of one example of the ink storage container according to the invention.

In the example shown in FIG. 7, although the ink storage container 30 has an approximately pillar shape (in particular, approximately right prismatic shape), the shape thereof is not limited thereto, and any shape may be used. The ink storage container 30 is primarily formed of a plastic plate of a synthetic resin (such as a polypropylene) and is partially formed in some cases from a flexible member (a film formed using, for example, at least one selected from a polyolefin (such as a polyethylene or a polypropylene), a polyamide, a polyester (such as a poly(ethylene terephthalate)), a vinyl-based copolymer (such as a vinyl acetate/vinyl chloride copolymer), and a metal or a metal oxide (such as aluminum or alumina)). In particular, the ink storage container 30 shown in FIG. 7 is formed by adhering a film 34 to one surface of a plastic container molded from a synthetic resin. In addition, at least part of the ink storage container 30 is preferably transparent or translucent. Accordingly, the state (the liquid level of the ink or the like) of the ink in the ink storage container 30 can be confirmed.

Since an ink composition which is generally used contains a solvent, such as a surfactant, having a high wettability, the wettability of the ink composition to a member forming the inside of the wall defining the ink chamber tends to be high. Hence, a thin film of the ink composition is liable to be formed on the inside of the wall 370, and the thin film thus formed may cause the generation of agglomerates in some cases. In order to suppress the generation of the thin film as described above, for a member forming the inside of the wall 370, a material having a high liquid repellency to the ink composition is preferably used. In particular, for example, a fluorine resin, a silicone resin, a polypropylene, a polystyrene, a polyethylene, a polyester, a poly(vinyl chloride), a phenol resin, a poly(vinyl acetate), or a poly(meth)acrylate (such as a poly(methyl (meth)acrylate)) is preferably used. Those materials may be used alone, or at least two types thereof may be used in combination. Among those materials, an ink repellent material, such as a fluorine compound or a silicone resin, is more preferable.

In addition, in this embodiment, the "poly(meth)acrylate" represents both a polyacrylate and a polymethacrylate, and the "poly(methyl (meth)acrylate)" represents both a poly (methyl acrylate) and a poly(methyl methacrylate).

As the fluorine compound, for example, an organic compound having a fluorine atom or a fluorine resin may be mentioned. As the organic compound having a fluorine atom, for example, a fluoroalkyl silane, or an alkane, a carboxylic acid, an alcohol, or amine, each of which has a fluoroalkyl group, is preferably used. For example, there may be mentioned heptadecafluoro-1,1,2,2-tetrahydrodecyl trimethoxysilane or heptadecafluoro-1,1,2,2-tetrahydro trichlorosilane as the fluoroalkyl silane; octafluorocyclobutane, perfluoromethylcyclohexane, perfluoro-n-hexane, perfluoro-n-heptane, tetradecafluoro-2-methylpentane, perfluorododecane, or perfluoroeicosane as the alkane having a fluoroalkyl group; perfluorodecane acid or perfluorooctane acid as the carboxylic acid having a fluoroalkyl group; 3,3,4,4,5,5,5-heptafluoro-2-pentanol as the alcohol having a fluoroalkyl group; or heptadecafluoro-1,1,2,2-tetrahydrodecylamine as the amine having a fluoroalkyl group. As the fluorine resin, for example, there may be mentioned a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), a polychlorotrifluoroethylene (PCTFE), a chlorotrifluoroethylene-ethylene copolymer (ECTFE), or a polytetrafluoroethylene (PTFE).

As the silicone resin, a polymer having a siloxane structural unit substituted by an organic group, such as an alkyl group, may be mentioned. For example, there may be used a polymer having a dimethylsiloxane skeleton, such as α,ω-bis(3-aminopropyl)polydimethylsiloxane, α,ω-bis(3-glycidoxypropyl)polydimethylsiloxane, or α,ω-bis(vinyl) polydimethylsiloxane.

On the inside of the wall 370 defining the ink chamber 340, a liquid repellent layer may be provided. The liquid repellent layer is formed, for example, by applying a liquid repellent agent (such as the fluorine compound or the silicone resin mentioned above) or the like. In addition, when a liquid repellent layer is provided on the inside of the wall 370, a member forming the inside of the wall 370 is the liquid repellent layer. As the liquid repellent agent, a commercially available product may be used, and for example, HC303VP (trade name, manufactured by Wacker Asahikasei Silicone Co., Ltd., silicone resin) or SF Coat (trade name, manufactured by AGC Seimi Chemical Co., Ltd., fluorine compound) may be mentioned.

On the surface of the member forming the inside of the wall 370 defining the ink chamber 340, a fine periodic structure may be provided. The fine periodic structure may be formed by a method for manufacturing a resin molded body described in JP-A-2012-66417. The fine periodic structure indicates a structure in which pyramid bodies (such as triangular pyramids, quadrangular pyramids, or hexagonal pyramids) are continuously provided, and the distance between the peaks of adjacent pyramids is approximately 1.0 to 100 μm. Accordingly, the liquid repellent property between the member forming the inside of the wall 370 and the ink composition can be enhanced.

In the use state, the first flow path 310 is formed in a side surface wall forming the side surface of the ink storage container 30. The first flow path 310 includes the air opening port 317, the communication flow path 320, the film member 316, the gas-liquid separation chamber 312, and the communication flow path 314. The gas-liquid separation chamber 312 has a concave shape, and an opening is formed in a concave-shaped bottom surface. The gas-liquid separation chamber 312 communicates with the communication flow path 314 through the opening of the bottom surface. One end of the communication flow path 314 is the air inlet 318 (see FIG. 5). A bank 313 is formed all along the periphery of an inside wall surrounding the bottom surface of the gas-liquid separation chamber 312. The film member 316 is adhered to the bank 313. In addition, a film member 322 is adhered to the ink storage container 30 so as to cover a flow path of the first flow path 310, the flow path being formed in the outside surface of the ink storage container 30. Accordingly, the communication flow path 320 is formed, and at the same time, the ink inside the ink storage container is prevented from flowing out to the outside. In addition, in order to increase the distance from the air opening port 317 to the gas-liquid separation chamber 312, the communication flow path 320 is partially formed along the outside periphery of the gas-liquid separation chamber 312. Accordingly, the moisture in the ink in the ink storage container 30 can be prevented from evaporating outside through the air inlet 318.

Before reaching the air chamber 330, the air flowing in the first flow path 310 passes through the film member 316 functioning as a gas-liquid separation membrane adhered to the bank 313. Accordingly, the ink stored in the ink storage container 30 can be further suppressed from flowing out to the outside.

The ink discharge portion 306 has a tube shape, and a flow path is formed therein. The ink supply pipe 24 is connected to this ink discharge portion 306. In addition, the other end 348 of the ink discharge portion 306 is opened to the outside.

In the ink storage container 30, in order to trap agglomerates generated in the ink chamber 340 or foreign materials and the like mixed therein when the ink is charged, a filter (not shown) may be provided. This filter may be provided, for example, at the ink outlet 349 or the ink discharge portion 306 in the ink storage container 30.

The ink chamber 340 is connected to the inside of the wall 370 and may have the structure in which a support body (not shown) supporting the wall 370 is provided.

In addition, after an initial charge of the ink (for example, when the ink storage container is shipped out or the like, the ink is charged in the ink chamber in an amount of approximately 90% thereof) is performed, the gas-liquid interface of the ink and a specific portion of the wall defining the ink chamber may be placed in the state so as to be in contact with each other for a long time. In the case described above, at the wall in contact with the gas-liquid interface of the ink, agglomerates caused by the ink are liable to be generated in some cases. However, in the ink jet recording device according to this embodiment, since the ink composition according to this embodiment is used as the ink set, there can be provided an ink jet recording device which can suppress the generation of gas-liquid interface foreign materials in long-term printing using a continuous supply type ink storage container and which can obtain a printed material excellent in not only continuous printing stability but also image robustness.

2. EXAMPLES

Hereinafter, although the invention will be described in more detail with reference to examples and comparative examples, the invention is not limited thereto.

2.1. Preparation of Ink Composition

The amounts of the components shown in Table 1 were mixed and stirred with each other, and the mixtures thus obtained were each processed by pressure filtration using a membrane filter having a pore size of 10 µm, so that the ink compositions were obtained. In addition, the values shown in Table 2 each represent the content (percent by mass) in the ink, and water was added so that the total mass of the ink composition was 100 percent by mass. In addition, as for the pigment, the dye, and the resin emulsion, the solid component-conversion value is shown.

TABLE 2

| | Ink Composition | Example 1 | Example 2 | Example 3 | Example 4 | Example 5 | Example 6 | Example 7 | Example 8 | Example 9 |
|---|---|---|---|---|---|---|---|---|---|---|
| Pigment | Self-Dispersed Pigment 1 (Solid Component) | 6.0 | | 8.0 | | 6.0 | 6.0 | 6.0 | 6.0 | 4.0 |
| | Self-Dispersed Pigment 2 (Solid Component) | | | | | | | | | |
| | Resin Coated Pigment 1 (Solid Component) | | 5.0 | | 7.0 | | | | | |
| | Resin Coated Pigment 2 (Solid Component) | | | | | | | | | |
| | Resin Coated Pigment 3 (Solid Component) | | | | | | | | | |
| Dye | C.I. Direct Black 168 | | | | | | | | | |
| Resin Emulsion | Resin Emulsion (Solid Component) | | | | | | 3.0 | | | |
| Organic Compound | Glycerin (Moisture Absorption Rate 240%) | 5.0 | 5.0 | 5.0 | 5.0 | 5.0 | 10.0 | 3.5 | 10.0 | 5.0 |
| | Trimethylolpropane (Moisture Absorption Rate 180%) | 3.0 | 3.0 | 3.0 | 3.0 | 3.0 | 3.0 | 1.5 | 5.0 | 3.0 |
| | Triethylene Glycol (Moisture Absorption Rate 190%) | 4.0 | 4.0 | 4.0 | 4.0 | 4.0 | 4.0 | 4.0 | 7.0 | 4.0 |
| | Betafin BP 20 (Moisture Absorption Rate 360%) | 5.0 | 5.0 | 5.0 | 5.0 | 5.0 | — | 5.0 | 7.0 | 5.0 |

TABLE 2-continued

|  |  | | | | | | | | | |
|---|---|---|---|---|---|---|---|---|---|---|
| | Triethylene Glycol Monobutyl Ether (Moisture Absorption Rate 20%) | 3.0 | 3.0 | 3.0 | 3.0 | 3.0 | 3.0 | 3.0 | 3.0 | 3.0 |
| | 1,2-Hexanediol (Moisture Absorption Rate 60%) | 3.0 | 3.0 | 3.0 | 3.0 | 3.0 | 3.0 | 3.0 | 3.0 | 3.0 |
| | Olfin E1010 | 0.5 | 0.5 | 0.5 | 0.5 | 0.5 | 0.5 | 0.5 | 0.5 | 0.5 |
| | Surfynol 104PG50 | 0.5 | 0.5 | 0.5 | 0.5 | 0.5 | 0.5 | 0.5 | 0.5 | 0.5 |
| | Triethanolamine (Moisture Absorption Rate 190%) | 1.0 | 1.0 | 1.0 | 1.0 | 1.0 | 1.0 | 1.0 | 1.0 | 1.0 |
| Water | Ultrapure Water | Balance | Balance | Balance | Balance | Balance | Balance | Balance | Balance | Balance |
| | Resolubility Index (Unit: Minutes) | 1.5 | 4.0 | 3.0 | 5.0 | 8.5 | 10.0 | 8.5 | 1.0 | 0.5 |
| | Total Amount of Organic Compounds Having Moisture Absorption Rate of 150% or More | 18.0 | 18.0 | 18.0 | 18.0 | 18.0 | 18.0 | 15.0 | 30.0 | 18.0 |
| | Total Amount of Organic Compounds Having Moisture Absorption Rate of 300% or More | 5.0 | 5.0 | 5.0 | 5.0 | 5.0 | — | 5.0 | 7.0 | 5.0 |
| Evaluation | Printing Stability in Printer Long-Term Use | A | A | A | A | B | C | B | A | A |
| | Printed-Material Robustness (Water Resistance) | A | A | A | A | A | A | A | B | A |
| | Printed-Material Robustness (Line-Maker Resistance) | B | A | B | A | A | B | B | B | B |

| | Ink Composition | Example 10 | Example 11 | Example 12 | Comparative Example 1 | Comparative Example 2 | Comparative Example 3 | Comparative Example 4 |
|---|---|---|---|---|---|---|---|---|
| Pigment | Self-Dispersed Pigment 1 (Solid Component) | | | 6.0 | | | 6.0 | 6.0 |
| | Self-Dispersed Pigment 2 (Solid Component) | 5.0 | | | | | | |
| | Resin Coated Pigment 1 (Solid Component) | | | | | | | |
| | Resin Coated Pigment 2 (Solid Component) | | | | 5.0 | | | |
| | Resin Coated Pigment 3 (Solid Component) | | 5.0 | | | | | |
| Dye | C.I. Direct Black 168 | | | | | 5.0 | | |
| Resin Emulsion | Resin Emulsion (Solid Component) | | | 3.0 | | | | |
| Organic Compound | Glycerin (Moisture Absorption Rate 240%) | 5.0 | 5.0 | 5.0 | 5.0 | 5.0 | 3.5 | 10.0 |
| | Trimethylolpropane (Moisture Absorption Rate 180%) | 3.0 | 3.0 | 3.0 | 3.0 | 3.0 | 1.5 | 5.0 |
| | Triethylene Glycol (Moisture Absorption Rate 190%) | 4.0 | 4.0 | 4.0 | 4.0 | 4.0 | 3.0 | 7.0 |
| | Betafin BP 20 (Moisture Absorption Rate 360%) | 5.0 | 5.0 | 15.0 | 5.0 | 5.0 | 3.0 | 10.0 |
| | Triethylene Glycol Monobutyl Ether (Moisture Absorption Rate 20%) | 3.0 | 3.0 | 3.0 | 3.0 | 3.0 | 3.0 | 3.0 |
| | 1,2-Hexanediol (Moisture Absorption Rate 60%) | 3.0 | 3.0 | 3.0 | 3.0 | 3.0 | 3.0 | 3.0 |
| | Olfin E1010 | 0.5 | 0.5 | 0.5 | 0.5 | 0.5 | 0.5 | 0.5 |
| | Surfynol 104PG50 | 0.5 | 0.5 | 0.5 | 0.5 | 0.5 | 0.5 | 0.5 |
| | Triethanolamine (Moisture Absorption Rate 190%) | 1.0 | 1.0 | 1.0 | 1.0 | 1.0 | 1.0 | 1.0 |
| Water | Ultrapure Water | Balance | Balance | Balance | Balance | Balance | Balance | Balance |
| | Resolubility Index (Unit: Minutes) | 4.0 | 4.0 | 7.0 | >30.0 | 0.1 | 20.0 | 0.2 |
| | Total Amount of Organic Compounds Having Moisture Absorption Rate of 150% or More | 18.0 | 18.0 | 28.0 | 18.0 | 18.0 | 12.0 | 33.0 |
| | Total Amount of Organic Compounds Having Moisture Absorption Rate of 300% or More | 5.0 | 5.0 | 15.0 | 5.0 | 5.0 | 3.0 | 10.0 |
| Evaluation | Printing Stability in Printer Long-Term Use | A | A | A | D | A | D | A |
| | Printed-Material Robustness (Water Resistance) | A | A | A | A | C | A | C |
| | Printed-Material Robustness (Line-Maker Resistance) | B | A | A | A | C | B | C |

The pigment dispersion liquid, the dye dispersion liquid, and the resin emulsion shown in Table 2 were prepared as described below.

Preparation of Self-Dispersed Pigment Dispersion Liquid 1

After 20 g of commercially available carbon black S170 (trade name, manufactured by Degussa) was mixed with 500 g of water, the mixture thus prepared was dispersed for minutes by a household mixer. After the liquid thus obtained was received in a 3-liter glass container equipped with a stirring device, while the liquid was stirred by the stirring device, a gas containing ozone at an ozone concentration of 8 percent by mass was introduced into the liquid at a rate of 500 mL/minute. In this step, ozone was generated by using an electrolytic generation type ozonizer (manufactured by Permelex Electrode Ltd.) as an ozone generation device. After a raw dispersion liquid thus obtained was filtrated using a glass fiber filter GA-100 (trade name, manufactured by Advantec Toyo Kaisha Ltd.), the condensation was further performed until the solid component concentration reached 20 percent by mass while the pH was controlled at 9 by addition of a 0.1N potassium hydroxide solution, so that a self-dispersed pigment dispersion liquid 1 was obtained.
Preparation of Self-Dispersed Pigment Dispersion Liquid 2

Except that C.I. Pigment Yellow 74 was used instead of using the above carbon black, by a method similar to that described above, a self-dispersed pigment dispersion liquid 2 was obtained.
Preparation of Resin Coated Pigment Dispersion Liquid 1

After 20 parts by mass of an organic solvent (methyl ethyl ketone), 0.03 parts by mass of a polymerization chain transfer agent (2-mercaptoethanol), a polymerization initiator, 15 parts by mass of a polypropylene glycol monomethacrylate (propylene oxide=9), parts by mass of a poly (ethylene glycol/propylene glycol)monomethacrylate (propylene oxide=7, ethylene oxide=5), 12 parts by mass of methacrylic acid, 50 parts by mass of a styrene monomer, 10 parts by mass of a styrene macromer, and 10 parts by mass of benzyl methacrylate were charged in a reaction vessel which was sufficiently purged with a nitrogen gas, polymerization was performed at 75° C. with stirring, and after 0.9 parts by mass of 2,2'-azobis(2,4-dimethylvaleronitrile) dissolved in 40 parts by mass of methyl ethyl ketone was added with respect to 100 parts by mass of the monomer components, aging was performed at 80° C. for 1 hour, so that a polymer solution was obtained.

After 7.5 parts by mass of the water-insoluble polymer obtained as described above was dissolved in 45 parts by mass of methyl ethyl ketone, a predetermined amount of a 20% sodium hydroxide aqueous solution (neutralizer) was added thereto to neutralize a salt-forming group, and after 20 parts by mass of the above carbon black S170 was added as the pigment, kneading was performed for 2 hours using a bead mill. After 120 parts by mass of ion exchanged water was added to the kneaded product thus obtained and then stirred, methyl ethyl ketone was removed at 6° C. under reduced-pressure conditions, and water was further partially removed, so that a resin coated pigment dispersion liquid 1 having a solid component concentration of 20 percent by mass was obtained.
Preparation of Resin Coated Pigment Dispersion Liquid 2

After 100 parts of triethylene glycol monobutyl ether (hereinafter, referred to as "BTG") and 600 parts of a macromonomer MM-1 (trade name, manufactured by Toagosei Co., Ltd.) solution were charged in a reaction vessel A, the mixture thus obtained was heated to 80° C. In addition, 200 parts of styrene (hereinafter, referred to as "St"), 100 parts of butyl acrylate (hereinafter, referred to as "BA"), and 5 parts of t-butylperoxy-2-ethylhexanoate (hereinafter, referred to as "PBO") were charged in a different reaction vessel and were sufficiently stirred, so that a monomer liquid was prepared. After one half of this monomer liquid was added to the reaction vessel A, the remaining one half was slowly dripped thereinto over 1 hour. After the dripping was completed, polymerization was performed for 3 hours. After 2.5 parts of PBO was added and then heated to 85° C., polymerization was further performed for 4 hours. Next, 32.3 parts of potassium hydroxide (KOH) and 467.7 parts of water were added for neutralization, so that a polymer solution containing a polymer (copolymer CP-1) was obtained. The solid component concentration of the polymer solution thus obtained was measured after sampling, and the polymerization conversion rate calculated from a nonvolatile component was 100%. In addition, the number average molecular weight (hereinafter, referred to as "Mn") of the copolymer CP-1 was 15,900, the weight average molecular weight (hereinafter, referred to as "Mw") was 38,500, and the polydispersity index (hereinafter, referred to as "PDI") was 2.42. In addition, a peak of the molecular weight derived from the macromonomer was not observed. In addition, when the molecular weight was measured using a UV detector, Mn was 15,600, Mw was 39,100, and PDI was 2.51. The reason for this is believed that a monomer component forming the polymer chain B had an aromatic ring, and a large absorption was observed. In addition, it is also believed that since the macromonomer MM-1 was polymerized with the monomer component forming the polymer chain B, the molecular weight was increased, and a graft copolymer was obtained. In the following synthetic example, by the measurement similar to that described above, it was confirmed that an obtained copolymer 1 was a graft copolymer. In addition, based on the result obtained by measurement of the solid component concentration, ion exchanged water was added to the polymer solution thus obtained, so that the solid component concentration was adjusted to 30%.

Next, 233.3 parts of a polymer solution containing the copolymer obtained as described above, 70 parts of diethylene glycol monobutyl ether, and 311.7 parts of water were mixed together, so that a slightly cloudy translucent solution was obtained. After 350 parts of the above carbon black S170 was added to this solution, stirring was performed using a disperser for 30 minutes, so that a mill base was formed. By the use of a horizontal type disperser (trade name: "Dyno-Mill 0.6-liter ECM model", manufactured by Shinmaru Enterprises Corporation, diameter of zirconia-made bead: 0.5 mm), a dispersion treatment was performed at a circumferential velocity of 10 m/s, so that the pigment was sufficiently dispersed in the mill base. Subsequently, 316 parts of water was added, so that the pigment concentration was set to 18%. After the mill base recovered from the disperser was processed by a centrifugal treatment (7,500 rpm, 20 minutes), filtration was performed using a membrane filter having a pore size of 10 After dilution was performed with water, a resin coated pigment dispersion liquid 2 having a pigment concentration of 14% was obtained.
Preparation of Resin Coated Pigment Dispersion Liquid 3

Except that the above carbon black was changed to C.I. Pigment Yellow 74, by a method similar to that of the resin coated pigment dispersion liquid 1, a resin coated pigment dispersion liquid 3 was obtained.
Preparation of Resin Emulsion After 900 g of ion exchanged water and 1 g of sodium lauryl sulfate were charged in a reaction vessel equipped with a stirrer, a reflux condenser, a dripping device, and a thermometer, while nitrogen purge was performed, the temperature was increased to 70° C. with stirring. While the inside temperature was maintained at 70° C., after 4 g of potassium persulfate was added as a polymerization initiator and dissolved, an emulsion formed in advance by addition of 20 g of acrylamide, 365 g of styrene, 545 g of butyl acrylate, and 30 g of methacrylic acid to 450 g of ion exchanged water and 3 g of sodium lauryl sulfate was continuously dripped in the reaction solution over 4 hours. After the dripping was completed, aging was performed for 3 hours. After the resin emulsion thus obtained was cooled to room temperature, ion exchanged water and a sodium hydroxide aqueous solution were added, so that the solid component and the pH were adjusted at 40 percent by mass and 8, respectively. The glass transition temperature of the resin particles of the aqueous emulsion thus obtained was −6° C.

In addition, among the components shown in Table 2, the components represented by the trade names are as follows.

Betaine BP 20 (registered trade name, manufactured by DuPont, trimethylglycine)

Olefin E1010 (trade name, manufactured by Nisshin Chemical Industry Co., Ltd., acetylene glycol-based surfactant)

Surfynol 104PG50 (trade name, manufactured by Nisshin Chemical Industry Co., Ltd., acetylene glycol-based surfactant)

2.2 Definition of Parameters 2.2.1. Resolubility Index (Unit: Minutes)

A time required for that the viscosity of a thickened ink at a moisture evaporation rate of 50% is returned by addition of the same amount of water to the viscosity of an ink at a moisture evaporation rate of 0% is defined as the resolubility index.

In particular, for the measurement of the resolubility index, an ink before being exposed was prepared, and a viscosity $\eta_0$ at 20° C. and a shear rate of 200 s$^{-1}$ was measured by a viscoelastic measurement device Physica MCR301 (trade name, manufactured by Anton Paar Japan K.K.). Next, 50 g of the ink was poured in a beaker and was exposed in an environment of 25° C. and 40% RH while the beaker was opened to the air until the ink weight was decreased to approximately 25 g, so that a thickened ink was obtained. The thickened ink thus obtained was slowly sampled using a spatula and was transferred to a petri dish, and a mass W1 of this thickened ink was measured. In addition, the same amount of pure water as that of the thickened ink thus sampled was dripped to this thickened ink, and the ink was then exposed in an environment of 25° C. and 40% RH. Subsequently, a viscosity $\eta_1$ at 20° C. and a shear rate of 200 s$^{-1}$ was measured, and an exposure time at which $\eta_1$ reached $\eta_0$ was measured, so that the resolubility index (min) was obtained.

2.2.2. Moisture Absorption Rate (Unit: %)

The moisture absorption rate shown in Table 2 represents the ratio (B/A) of a moisture mass (B) to be held in an organic compound to the mass (A) thereof and is obtained by the following measurement method.

First, the mass of an organic compound exposed in an environment of 25° C. and 50% RH was measured, and the measurement result was regarded as its own mass (A). Next, the organic compound was exposed in an environment of 25° C. and 99% RH, and the mass was measured with time. Subsequently, after the mass at which the mass of the organic compound was not changed was regarded as (C), (C)-(A) was calculated and was regarded as the moisture mass (B) to be held in the organic compound, and the moisture absorption rate in an environment of 25° C. and 99% RH was obtained by the following formula (1).

Moisture Absorption Rate (%)=(B)/(A)×100    Formula (1)

2.3. Evaluation Test 2.3.1. Evaluation of Printing Stability in Printer Long-Term Use The ink of each of the examples and the comparative examples was charged in an ink storage container of an ink jet printer (manufactured by Seiko Epson Corp., Model NEW-M660FTJ)) so that the amount of the ink was ⅓ of the container capacity, and the ink storage container was then exposed in an environment of 40° C. and 20% RH for 4 weeks. Subsequently, the ink in an amount equivalent to ⅓ of the container capacity was again charged (total: ⅔ of the container capacity) and was exposed in an environment of 40° C. and 20% RH for 4 weeks. After the same operation as described above was again performed so as to expose the ink storage container in an environment of 40° C. and 20% RH for totally 12 weeks, nozzle check, cleaning operation, and nozzle check were performed in this order, and the evaluation was performed in accordance with the following criteria. In this case, the normal ejection indicates that all the nozzles perform ejection without clogging and ejection curving.

Evaluation Criteria

A: Normal ejection without cleaning

B: Normal ejection by cleaning performed once

C: Normal ejection by cleaning performed 2 to 3 times

D: No normal ejection by cleaning performed 2 to 3 times 2.3.2 Evaluation of Printed-Material Robustness (Water Resistance)

On regular paper (Xerox-P), after printing was performed by using the printer described above, a printed material was exposed in a normal temperature and normal humidity environment for 1 week, and 0.2 g of pure water was then dripped on a printed portion, so that the evaluation was performed in accordance with the following criteria.

Evaluation Criteria

A: No bleeding in printed material, and no coloration of dripped pure water (visual inspection)

B: No bleeding in printed material, and coloration of dripped pure water (visual inspection)

C: Bleeding in printed material (visual inspection)

2.3.3. Evaluation of Printed-Material Robustness (Line-Marker Resistance)

After printing was performed in a manner similar to that of the above 2.3.2, and a printed material was exposed in a normal temperature and normal humidity environment for 1 week, line marking was performed on the printed material using a fluorescent pen manufactured by Zebra Co., Ltd at a force of 300 gf, and the evaluation was then performed in accordance with the following criteria.

Evaluation Criteria

A: No bleeding after line marking is performed twice on the same place

B: No bleeding after line marking is performed once

C: Bleeding after line marking is performed once 2.4. Evaluation Results

The results of the evaluation tests are shown in the lower columns of Table 2.

As shown in Table 2, in the examples each having a resolubility index of 0.5 to 10 minutes, the printing stability in printer long-term use and the printed-material robustness could be both obtained. In particular, in Examples 1 to 4 and 8 to 12 each having a resolubility index of 0.5 to 7 minutes, the evaluation of the printing stability was high. In addition, in all the examples, since the pigment was used as a colorant, the printed-material robustness was excellent. In particular, in Examples 1 to 5 and 9 to 12 each containing, with a good balance, organic compounds having a moisture absorption rate of 150% or more and also organic compounds having a moisture absorption rate of 300% or more, the evaluations of the printing stability and the printed-material robustness were both high. On the other hand, in the comparative examples, the printing stability and the printed-material robustness could not be simultaneously obtained. In particular, in Comparative Examples 1 and 3 each having a high resolubility index, the evaluation result of the printing stability was low, and on the other hand, in Comparative Examples 2 and 4 each having a very low resolubility index, the evaluation result of the printed-material robustness was low. As described above, when the resolubility index is 0.5 to 10 minutes, in long-term printing using a continuous supply type ink storage container, the generation of gas-liquid interface foreign materials is suppressed, and a printed material excellent in not only continuous printing stability but also image robustness can be obtained.

The invention is not limited to the embodiments described above and may be variously changed and modified. For example, the invention includes the substantially same structure (such as the structure in which the function, the method, and/or the result is the same or the structure in which the object and/or the advantage is the same) as that described in the embodiment. In addition, the invention includes the structure in which a nonessential part of the structure described in the embodiment is replaced. In addition, the invention includes the structure which obtains the same operational advantage or achieves the same object as that of the structure described in the embodiment. In addition, the invention also includes the structure in which a known technique is incorporated in the structure described in the embodiment.

The entire disclosure of Japanese Patent Application No. 2016-257341, filed Dec. 29, 2016 is expressly incorporated by reference herein.

What is claimed is:

1. An ink composition to be charged in an ink storage container which includes an ink composition-replenishable ink chamber and an openable ink inlet, the ink chamber being able to communicate with outside air, the ink composition comprising:
    a self-dispersed pigment having a hydrophilic group on a pigment surface thereof or a self-dispersed pigment having a hydrophilic group on the pigment surface thereof with a phenyl group interposed therebetween;
    an organic compound; and
    water,
    wherein the ink has a viscosity $\eta 0$ at 20 degrees C., and a resolubility index of the ink composition is 0.5 to 10 minutes,
    the resolubility index is determined by exposing 50 g of the ink composition having the viscosity $\eta 0$ to an environment having a temperature of 25 degrees C. and a relative humidity of 40% until the mass of the ink composition is reduced 25 g to yield a thickened ink, adding water to the thickened ink while in the environment having the temperature of 25 degrees C. and the relative humidity of 40% until a mass of the thickened ink is increased from 25 g to 50 g, and determining a viscosity $\eta 1$ of the thickened ink after adding the water, and
    the amount of time that elapses from when the water is added to the thickened ink until $\eta 0 = \eta 1$ defines the resolubility index.

2. The ink composition according to claim 1, further comprising a resin emulsion.

3. An ink set comprising:
the ink composition according to claim 2,
wherein the ink composition includes at least one type of ink composition selected from the group consisting of a black ink composition and a color ink composition.

4. The ink composition according to claim 1,
wherein the total of organic compounds having a moisture absorption rate of 150% or more is 15 to 30 percent by mass.

5. The ink composition according to claim 4,
wherein the total of organic compounds having a moisture absorption rate of 300% or more is 5 to 15 percent by mass.

6. An ink set comprising:
the ink composition according to claim 5,
wherein the ink composition includes at least one type of ink composition selected from the group consisting of a black ink composition and a color ink composition.

7. The ink composition according to claim 4,
wherein the organic compound having a moisture absorption rate of 150% or more includes trimethylglycine.

8. An ink set comprising:
the ink composition according to claim 7,
wherein the ink composition includes at least one type of ink composition selected from the group consisting of a black ink composition and a color ink composition.

9. An ink set comprising:
the ink composition according to claim 4,
wherein the ink composition includes at least one type of ink composition selected from the group consisting of a black ink composition and a color ink composition.

10. An ink set comprising:
the link composition according to claim 1,
wherein the ink composition includes at least one type of ink composition selected from the group consisting of a black ink composition and a color ink composition.

11. The ink set according to claim 10
wherein the ink set includes the black ink composition and the color ink composition, and
the pigments contained in the black ink composition and the color ink composition are each a self-dispersed pigment or a resin coated pigment.

12. An ink jet recording device comprising:
an ink storage container receiving the ink set according to claim 11;
a print head ejecting the ink composition; and
an ink supply flow path supplying the ink composition from the ink storage container to the print head.

13. An ink jet recording device comprising:
an ink storage container receiving the ink set according to claim 10;
a print head ejecting the ink composition; and
an ink supply flow path supplying the ink composition from the ink storage container to the print head.

* * * * *